(12) United States Patent  
Chen

(10) Patent No.: US 12,086,380 B2
(45) Date of Patent: Sep. 10, 2024

(54) INTERFACE DISPLAY METHOD AND ELECTRONIC DEVICE

(71) Applicant: VIVO MOBILE COMMUNICATION CO.,LTD., Guangdong (CN)

(72) Inventor: Yong Chen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/577,915

(22) Filed: Jan. 18, 2022

(65) Prior Publication Data

US 2022/0137792 A1 May 5, 2022

Related U.S. Application Data

(63) Continuation of application No. PCT/CN2020/099522, filed on Jun. 30, 2020.

(30) Foreign Application Priority Data

Jul. 30, 2019 (CN) .......................... 201910696075.0

(51) Int. Cl.
G06F 3/048 (2013.01)
G06F 3/04817 (2022.01)
G06F 3/0486 (2013.01)

(52) U.S. Cl.
CPC ........ G06F 3/04817 (2013.01); G06F 3/0486 (2013.01)

(58) Field of Classification Search
CPC .... G06F 3/04817; G06F 3/0486; G06F 3/048; G06F 3/04847; G06F 9/451
See application file for complete search history.

(56) References Cited

U.S. PATENT DOCUMENTS

| 2006/0095864 | A1* | 5/2006 | Mock | G06F 3/016 715/810 |
| 2008/0222569 | A1* | 9/2008 | Champion | G06F 3/0482 715/834 |
| 2010/0093400 | A1* | 4/2010 | Ju | G06F 3/04817 715/702 |

(Continued)

FOREIGN PATENT DOCUMENTS

| CN | 103677509 A | * 3/2014 |
| CN | 105549808 A | 5/2016 |

(Continued)

OTHER PUBLICATIONS

The First Office Action of Priority Application No. CN 201910696075.0 issued by the Chinese Patent Office on Aug. 18, 2020.

(Continued)

*Primary Examiner* — Rashawn N Tillery
(74) *Attorney, Agent, or Firm* — IP & T GROUP LLP

(57) ABSTRACT

An interface display method includes: receiving a first input performed by a user for a first icon, where the first icon is an icon whose display size is smaller than a fixed size in at least two icons on a first interface; displaying the first icon in the fixed size in response to the first input; receiving a second input performed by the user for the first icon; and in response to the second input, displaying an interface of a first application program indicated by the first icon.

18 Claims, 13 Drawing Sheets

An electronic device receives a first input performed by a user on a first icon — S201

The electronic device displays the first icon in a fixed size in response to the first input — S202

The electronic device receives a second input performed by the user on the first icon — S203

In response to the second input, the electronic device displays an interface of a first application program indicated by the first icon — S204

(56) References Cited

U.S. PATENT DOCUMENTS

| | | | |
|---|---|---|---|
| 2011/0035691 A1* | 2/2011 | Kim | G06F 3/0486 715/765 |
| 2011/0041088 A1* | 2/2011 | Mason | G09B 29/10 715/767 |
| 2011/0096006 A1 | 4/2011 | Jeong et al. | |
| 2013/0307801 A1* | 11/2013 | Nam | H04M 1/72448 345/173 |
| 2013/0311920 A1* | 11/2013 | Koo | G06F 3/04883 715/765 |
| 2014/0201655 A1 | 7/2014 | Mahaffey et al. | |
| 2014/0258903 A1* | 9/2014 | Kanbara | G06F 3/0486 715/765 |
| 2014/0267103 A1* | 9/2014 | Chaudhri | G06F 3/04817 345/173 |
| 2015/0033184 A1* | 1/2015 | Kim | G06F 3/04817 715/808 |
| 2015/0317063 A1* | 11/2015 | Felt | H04M 1/72403 715/835 |
| 2016/0004416 A1* | 1/2016 | Kim | G06F 3/04817 715/769 |
| 2016/0313957 A1* | 10/2016 | Ebert | H04W 4/02 |
| 2017/0109011 A1* | 4/2017 | Jiang | G06F 3/04883 |
| 2017/0220226 A1* | 8/2017 | Wu | G06F 3/0485 |
| 2020/0257425 A1* | 8/2020 | Ye | H04L 65/40 |
| 2022/0229522 A1* | 7/2022 | Chueh | G06F 3/0483 |

FOREIGN PATENT DOCUMENTS

| | | | | |
|---|---|---|---|---|
| CN | 106406671 A | * | 2/2017 | ......... G06F 3/04817 |
| CN | 107272992 A | | 10/2017 | |
| CN | 108509105 A | * | 9/2018 | ......... G06F 3/04817 |
| CN | 109062471 A | * | 12/2018 | ......... G06F 3/0481 |
| CN | 110502164 A | | 11/2019 | |

OTHER PUBLICATIONS

The Second Office Action of Priority Application No. CN 201910696075.0 issued by the Chinese Patent Office on Jan. 22, 2021.

International Search Report and Written Opinion of Priority Application No. PCT/CN2020/099522 issued by the Chinese Patent Office on Sep. 30, 2020.

* cited by examiner

INTERFACE DISPLAY METHOD AND ELECTRONIC DEVICE

CROSS-REFERENCE TO RELATED APPLICATIONS

This application is a Bypass Continuation Application of PCT/CN2020/099522, filed on Jun. 30, 2020, which claims priority to Chinese Patent Application No. 201910696075.0, filed on Jul. 30, 2019, which are incorporated herein by reference in their entirety.

TECHNICAL FIELD

Embodiments of the present disclosure relate to the field of communications technologies, and in particular, to an interface display method and an electronic device.

BACKGROUND

With rapid development of communications technologies, an electronic device is increasingly widely used, and more and more application programs are installed in the electronic device. Correspondingly, icons of application programs displayed on a desktop of the electronic device increase accordingly.

SUMMARY

Embodiments of the present disclosure provide an interface display method and an electronic device.

According to a first aspect, the embodiments of the present disclosure provide an interface display method, and the method includes: receiving a first input performed by a user for a first icon, where the first icon is an icon whose display size is smaller than a fixed size in at least two icons on a first interface; displaying the first icon in the fixed size in response to the first input; receiving a second input performed by the user for the first icon; and in response to the second input, displaying an interface of a first application program indicated by the first icon.

According to a second aspect, the embodiments of the present disclosure provide an electronic device, and the electronic device includes:
  a first receiving module, configured to receive a first input performed by a user for a first icon, where the first icon is an icon whose display size is smaller than a fixed size in at least two icons on a first interface;
  a first display module, configured to display the first icon in the fixed size in response to the first input;
  a second receiving module, configured to receive a second input performed for the first icon; and
  a second display module, configured to: in response to the second input, display an interface of a first application program indicated by the first icon.

According to a third aspect, the embodiments of the present disclosure provide an electronic device. The electronic device includes a processor, a memory, and a computer program that is stored in the memory and executable on the processor, and when the computer program is executed by the processor, the steps of the interface display method in the first aspect are implemented.

According to a fourth aspect, the embodiments of the present disclosure provide a non-transitory computer-readable storage medium, where the non-transitory computer-readable storage medium stores a computer program, and when the computer program is executed by a processor, the steps of the interface display method in the first aspect are implemented.

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure shall fall within the protection scope of the present disclosure.

In this specification, a term "and/or" is an associative relationship for describing associated objects, indicating that three relationships may exist, for example, A and/or B, which may indicate three situations: A exists independently; A and B exist simultaneously; and B exists independently. In this specification, a symbol "/" indicates an "or" relationship between associated objects, for example, AB indicates A or B.

In the specification and claims of the present disclosure, the terms such as "first" and "second" are used to distinguish between different objects, but are not used to describe a particular sequence of the objects. For example, a first icon, a second icon, and the like are intended to distinguish between different icons, instead of describing a particular order of the icons.

In the embodiments of the present disclosure, the term such as "exemplary" or "for example" is used to represent an example, an illustration, or a description. Any embodiment or design scheme described as "exemplary" or "for example" in the embodiments of the present disclosure should not be construed as being more preferred or advantageous than other embodiments or design schemes. Exactly, use of the term "example" or "for example" is intended to present a concept in a specific manner.

In the descriptions of the embodiments of the present disclosure, unless otherwise stated, "a plurality of" means two or more, for example, a plurality of elements means two or more elements.

The following describes some terms/nouns in the embodiments of the present disclosure.

A fixed size is a size of an icon normally displayed in an icon placeholder in an electronic device, that is, a standard size of an icon in the electronic device.

Figure 1:
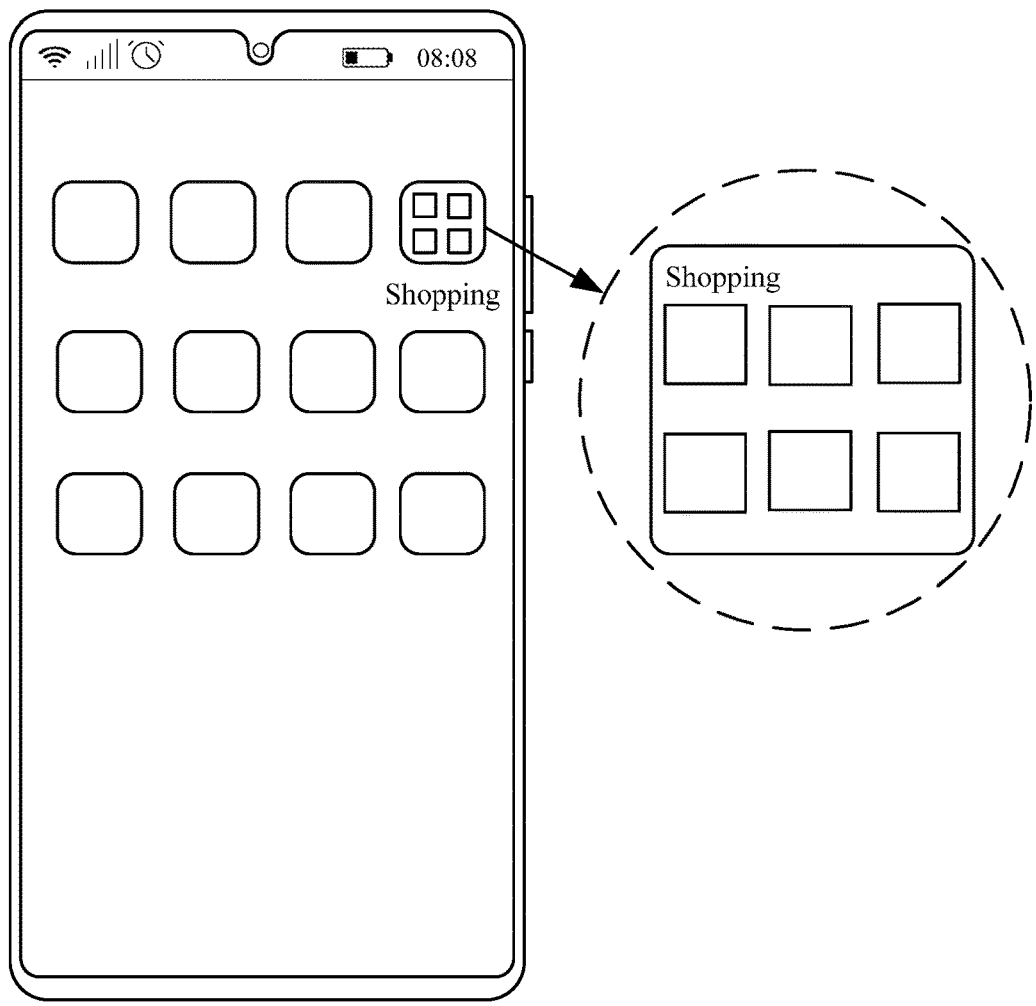
FIG. 1 is a schematic diagram of display icons on a conventional electronic device according to an embodiment of the present disclosure.

Currently, the electronic device may sequentially display the icons of these application programs on a main interface based on an installation sequence of the application programs in the electronic device. Alternatively, the electronic device may further display icons of a plurality of application programs in one folder of the main interface. For example, the electronic device may display icons of a plurality of shopping application programs in a folder shown in FIG. 1. Generally, when a user needs to trigger the electronic device to display an interface of an application program, the user may first find an icon of the application program in the electronic device. For example, the user may search the icons of the application programs displayed on the main interface and the folder one by one until the icon of the application program is found, and then the user triggers, by performing an input on the icon of the application program, the terminal to display the interface of the application program.

However, in a case that a large number of application programs are installed in the electronic device, the electronic device may display icons of these application programs on each interface of the desktop. Therefore, if the user wants to trigger the electronic device to display an interface of an application program, the user may need to sequentially search each interface for an icon of the application program. In this way, a process of searching for an application program by the user is relatively cumbersome and time-consuming.

Embodiments of the present disclosure provide an interface display method and an electronic device. A first input performed by a user for a first icon (an icon whose display size is smaller than a fixed size in at least two icons on a first interface) may be received; the first icon is displayed in the fixed size in response to the first input; a second input performed by the user for the first icon (displayed in the fixed size) is received; and in response to the second input, an interface of a first application program indicated by the first icon is displayed. In this solution, the electronic device may display an icon of an application program in a display size smaller than the fixed size. Therefore, a quantity of icons that may be displayed by the electronic device on the first interface may be greater than a quantity of icons displayed by the electronic device in the fixed size. In this way, when the user needs to trigger the electronic device to display an interface of an application program (for example, the first application program), the user may first trigger the electronic device to display an icon of the application program in the fixed size on the first interface, and then the user may trigger the electronic device to display the interface of the application program, that is, the user may trigger the electronic device to display the interface of the application program without searching for the icon of the application program on a plurality of interfaces of the electronic device, so that time consumed in a process of triggering the electronic device by the user to display the interface of the application program is reduced, and the user can quickly trigger the electronic device to display the interface of the application program.

The electronic device in the embodiments of the present disclosure may be an electronic device with an operating system. The operating system may be an Android operating system, an iOS operating system, or another possible operating system. This is not specifically limited in the embodiments of the present disclosure.

The following uses the Android operating system as an example to describe a software environment to which the interface display method provided in the embodiments of the present disclosure is applied.

Figure 2:
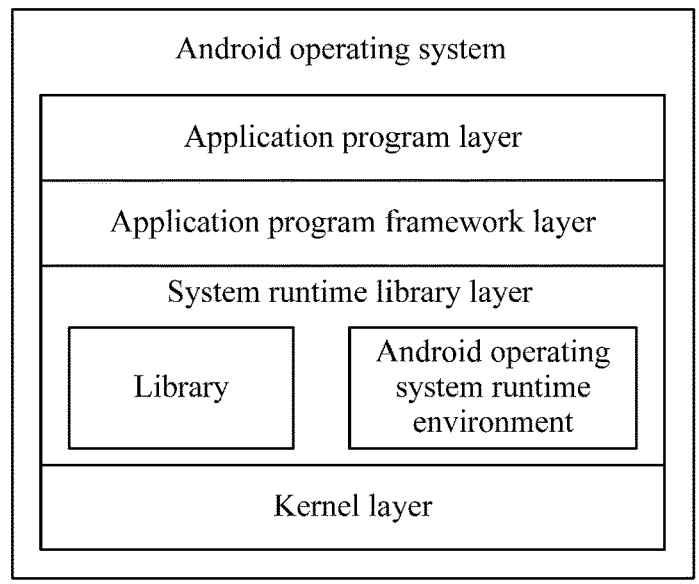
FIG. 2 is a schematic diagram of an architecture of an Android operating system according to an embodiment of the present disclosure.

As shown in FIG. 2, FIG. 2 is a schematic architectural diagram of a possible Android operating system according to an embodiment of the present disclosure. In FIG. 2, the architecture of the Android operating system includes 4 layers: an application program layer, an application program framework layer, a system runtime library layer, and a kernel layer (may be a Linux kernel layer).

The application program layer includes various application programs in the Android operating system (including system application programs and third-party application programs).

The application program framework layer is an application program framework, and the developer may develop some application programs based on the application program framework layer when following a development rule of the application program framework.

The system runtime library layer includes a library (also referred to as a system library) and an Android operating system runtime environment. The library mainly provides various resources required for the Android operating system. The Android operating system runtime environment is used to provide the Android operating system with a software environment.

The kernel layer is an operating system layer of the Android operating system, and is a lowest layer of software levels of the Android operating system. The kernel layer provides the Android operating system with a core system service and a hardware-related driver based on the Linux kernel.

The Android operating system is used as an example. In the embodiments of the present invention, a developer may develop, based on the system architecture of the Android operating system shown in FIG. 1, a software program to implement the interface display method provided in the embodiments of the present invention, so that the interface display method can run based on the Android operating system shown in FIG. 2. That is, a processor or an electronic device may run the software program in the Android operating system to implement the interface display method provided in the embodiments of the present disclosure.

The electronic device in the embodiments of the present disclosure may be a mobile terminal, or may be a non-mobile terminal. For example, the mobile terminal may be a mobile phone, a tablet computer, a laptop computer, a palmtop computer, an in-vehicle terminal, a wearable device, a ultra-mobile personal computer (UMPC), a netbook, or a personal digital assistant (PDA). The non-mobile terminal may be a personal computer (PC), a television (TV), an automated teller machine or a self-service machine. This is not specifically limited in the embodiments of the present disclosure.

The interface display method provided in the embodiments of the present disclosure may be performed by the foregoing electronic device, or a functional module and/or a functional entity that can implement the interface display method in the electronic device. This may be determined based on an actual use requirement, and is not limited in the embodiments of the present disclosure. Taking the electronic device as an example, the following describes the interface display method provided in the embodiments of the present disclosure.

In the embodiments of the present disclosure, the electronic device may display an icon of an application program in a display size smaller than a fixed size. In this way, a quantity of icons displayed by the electronic device on an interface (for example, a first interface in the embodiments of the present disclosure) may be increased. Then, when a user wants to trigger the electronic device to run an application program (that is, the electronic device displays an interface of an application program), the user may first search the interface for an icon of the application program (a display size of the icon of the application program is smaller than the fixed size), and then after finding the icon of the application program, the user may first trigger, through an input, the electronic device to display the icon of the application program in the fixed size, and trigger the electronic device to display the interface of the application program. In this way, when the user needs to trigger the electronic device to display an interface of an application program, another input is performed to trigger the electronic device to display the interface of the application program. In this way, the user can quickly find the icon of the application program, and trigger the electronic device to display the interface of the application program.

The following uses an example to describe the interface display method provided in the embodiments of the present disclosure with reference to the accompanying drawings.

Figure 3:
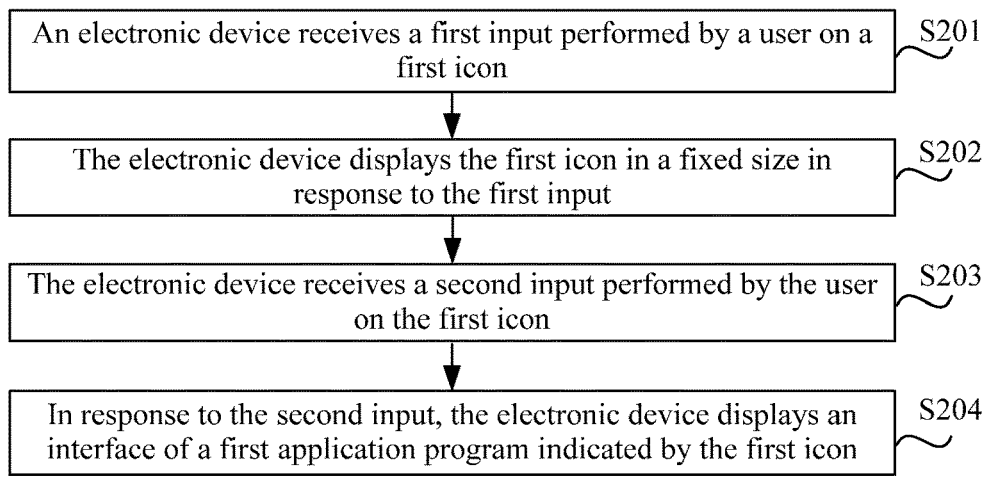
FIG. 3 is a first schematic diagram of an interface display method according to an embodiment of the present disclosure.

As shown in FIG. 3, an embodiment of the present disclosure provides an interface display method. The method may include the following S201 to S204.

S201. An electronic device receives a first input performed by a user for a first icon.

The first icon may be an icon whose display size is smaller than a fixed size in at least two icons on a first interface.

S202. The electronic device displays the first icon in the fixed size in response to the first input.

In this embodiment of the present disclosure, when the user wants to trigger the electronic device to display an interface of an application program indicated by the icon whose display size is smaller than the fixed size (that is, the first icon) in the at least two icons on the first interface, the user 6ay first trigger, through the first input, the electronic device to display the first icon in the fixed size, and then the user may trigger, through another input (for example, a second input in this embodiment of the present disclosure), the electronic device to display the interface of the application program indicated by the first icon (for example, a first application program in this embodiment of the present disclosure).

It should be noted that, in this embodiment of the present disclosure, the icon may be used to indicate an icon of an application program.

Optionally, in this embodiment of the present disclosure, the at least two icons may be displayed on the first interface, and display sizes of all icons in the at least two icons may be smaller than the fixed size, or display sizes of a part of icons in the at least two icons may be smaller than the fixed size. This may be determined based on an actual use requirement, and is not limited in this embodiment of the present disclosure.

Optionally, in this embodiment of the present disclosure, the at least two icons may be displayed in at least two display sizes.

For example, a part of icons in the at least two icons may be displayed in the fixed size, and the other part may be displayed in a display size smaller than the fixed size.

Optionally, in this embodiment of the present disclosure, each of the at least two display sizes may correspond to one display level. A larger display size indicates a higher display level corresponding to the display size.

Optionally, in this embodiment of the present disclosure, the first input may be a single-click input or a multiple-click input performed by the user for the first icon. This may be determined based on a display level corresponding to a display size of the first icon, and is not limited in this embodiment of the present disclosure.

In this embodiment of the present disclosure, it is assumed that a quantity of the at least two display sizes is N, a display level corresponding to the fixed size may be a level N, and the display level of the first icon is a level n. In this case, the first input may be an (N−n)-th click input performed by the user on the first icon. Both N and n are positive integers, and N is greater than n.

Figure 4A:
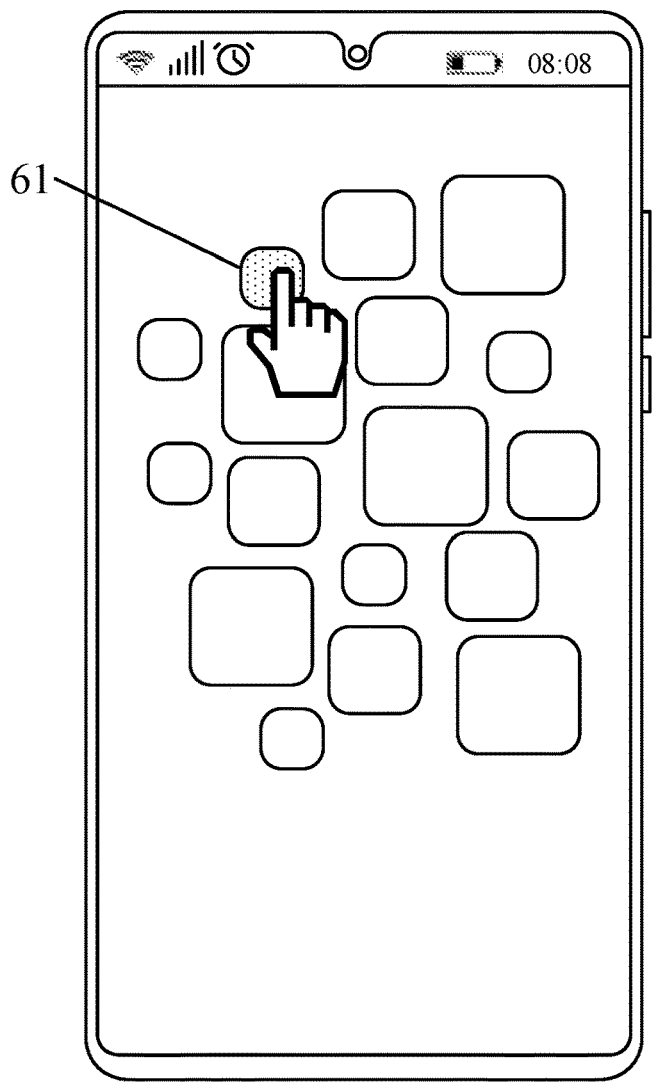
FIG. 4A is a first schematic diagram of an application interface in an interface display method according to an embodiment of the present disclosure.
Figure 4B:
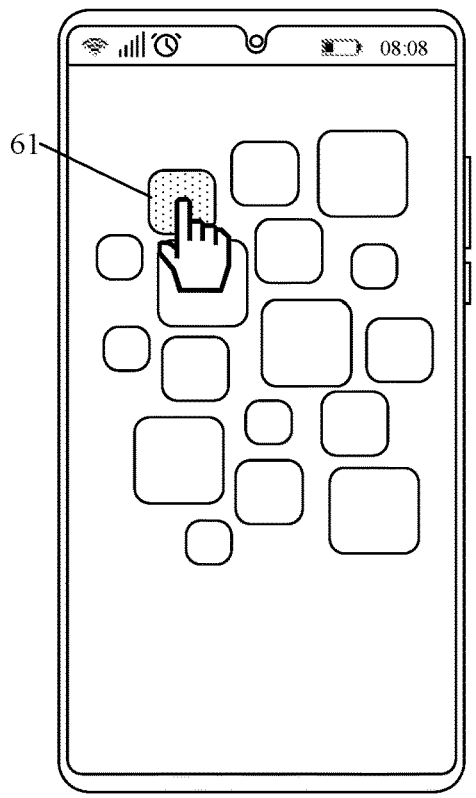
FIG. 4B is a second schematic diagram of an application interface in an interface display method according to an embodiment of the present disclosure.
Figure 4C:
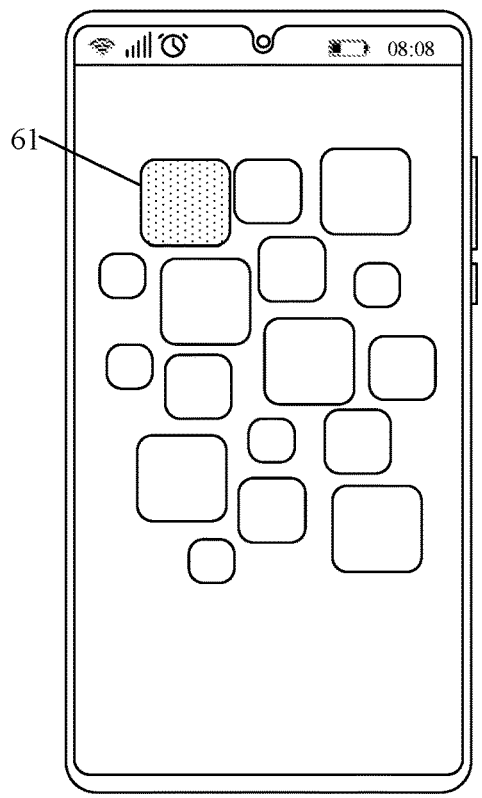
FIG. 4C is a third schematic diagram of an application interface in an interface display method according to an embodiment of the present disclosure.

For example, it is assumed that the display level of the fixed size is a level 3, and the display level of the first icon is a level 1. In this case, the first input may be a click input performed by the user for the first icon twice, that is, a double-click input. As shown in FIG. 4A, the user clicks a first icon 61 for the first time, and in response to the input, the electronic device may display the first icon 61 in a display size shown in FIG. 4B. Then the user clicks the first icon 61 again, and in response to the input, the electronic device may display the first icon 61 in the foregoing fixed size, that is, display the first icon 61 in a display size shown in FIG. 4C.

S203. The electronic device receives a second input performed by the user for the first icon.

S204. In response to the second input, the electronic device displays an interface of a first application program indicated by the first icon.

In this embodiment of the present disclosure, after the electronic device displays the first icon in the fixed size, the user may trigger, through the second input, the electronic device to display the interface of the application program (that is, the first application program) indicated by the first icon, so that the user can perform an operation on the interface of the first application program.

Optionally, in this embodiment of the present disclosure, the second input may be any possible input such as a single-click input, a double-click input, a long-press input, or a re-press input performed by the user for the first icon (the display size is the fixed size). This may be determined based on an actual use requirement, and is not limited in this embodiment of the present disclosure.

Optionally, in this embodiment of the present disclosure, the interface of the first application program displayed by the electronic device may be a home page of the first application program, or may be an interface of the first application program, for example, an interface on which the electronic device exits the first application program last time. This may be determined based on an actual use requirement, and is not limited in this embodiment of the present disclosure.

This embodiment of the present disclosure provides an interface display method. The electronic device may display an icon of an application program in a display size smaller than the fixed size. Therefore, a quantity of icons that may be displayed by the electronic device on the first interface may be greater than a quantity of icons displayed by the electronic device in the fixed size. In this way, when the user needs to trigger the electronic device to display an interface of an application program (for example, the first application program), the user may first trigger the electronic device to display an icon of the application program in the fixed size on the first interface, and then the user may trigger the electronic device to display the interface of the application program, that is, the user may trigger the electronic device to display the interface of the application program without searching for the icon of the application program on a plurality of interfaces of the electronic device, so that time consumed in a process of triggering the electronic device by the user to display the interface of the application program is reduced, and the user can quickly trigger the electronic device to display the interface of the application program.

Optionally, in this embodiment of the present disclosure, before the electronic device receives the first input performed by the user for the first icon, the user may trigger, through one input, the electronic device to display an interface (that is, the first interface) that includes at least two icons displayed in at least two display sizes. In this way, the user may quickly trigger, through the first input and the second input for the first icon, the electronic device to display the interface of the first application program indicated by the first icon.

Figure 5:
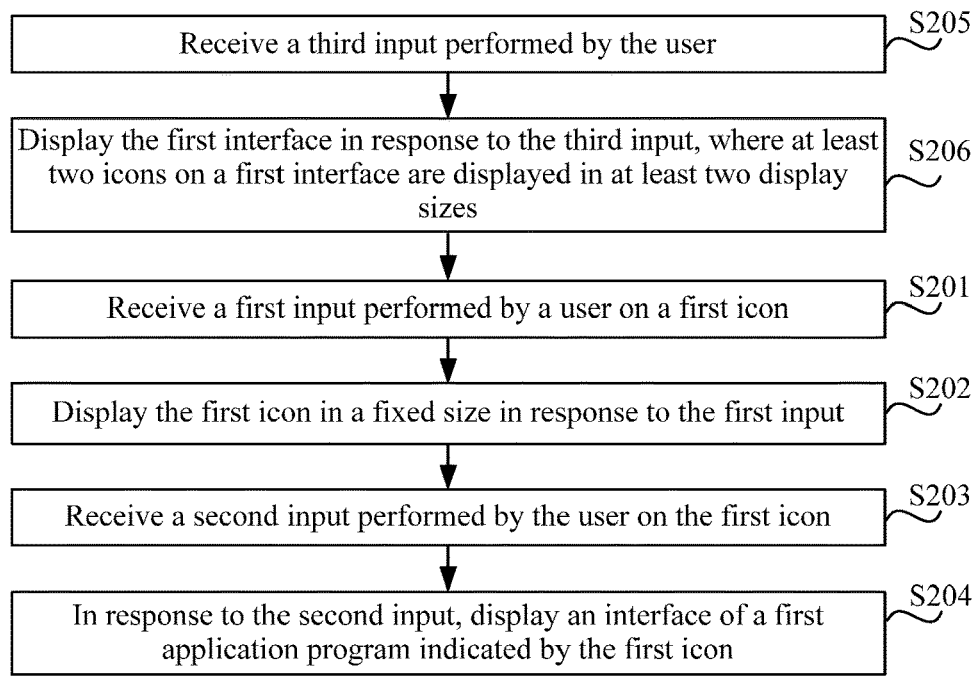
FIG. 5 is a second schematic diagram of an interface display method according to an embodiment of the present disclosure.

For example, with reference to FIG. 3, as shown in FIG. 5, before S201, the interface display method provided in this embodiment of the present disclosure may further include the following S205 and S206.

S205. The electronic device receives a third input performed by the user.

S206. The electronic device displays the first interface in response to the third input, where the at least two icons on the first interface are displayed in at least two display sizes.

A display size of each of the at least two icons corresponds to attribute information of an application program indicated by icon, and the attribute information of the application program includes at least one of the following: a use frequency of the application program, use duration of the application program, duration since the last time of using the application program, or an application type of the application program.

In this embodiment of the present disclosure, before the electronic device receives the first input performed by the user for the first icon, the user may trigger, through the third input, the electronic device to display the first interface. In this way, the user can quickly find, on the first interface, an icon of an application program that the user wants to trigger the electronic device to run, without searching for the icon on a plurality of interfaces of the electronic device, so that the user can quickly trigger, through an input on the icon on the first interface, the electronic device to display an interface of the application program indicated by the icon.

Optionally, in this embodiment of the present disclosure, the first interface may be an interface in the electronic device.

Optionally, in this embodiment of the present disclosure, the first interface may be an interface corresponding to a control (hereinafter referred to as a target control) in the electronic device; or the first interface may be an interface in a desktop of the electronic device. This may be determined based on an actual use requirement, and is not limited in this embodiment of the present disclosure.

Optionally, in this embodiment of the present disclosure, in a case that the first interface is the interface corresponding to the target control, the third input may be any possible input such as a single-click input, a double-click input, or a long-press input performed by the user on the control. In a case that the first interface is the interface in the desktop of the electronic device, the third input may be any possible input such as a left sliding input, a right sliding input, or a downward sliding input performed by the user on the desktop of the electronic device. This may be determined based on an actual use requirement, and is not limited in this embodiment of the present disclosure.

In this embodiment of the present disclosure, the long-press input may be an input performed by the user on the target control by using duration greater than or equal to a time threshold.

Optionally, in this embodiment of the present disclosure, the time threshold may be a value preset in the electronic device by a manufacturer of the electronic device. This may be determined based on an actual use requirement, and is not limited in this embodiment of the present disclosure.

Optionally, in this embodiment of the present disclosure, in a case that there are many application programs in the electronic device, the electronic device may fail to display icons of these application programs on the first interface. In this case, after the electronic device displays the first interface, the electronic device may update icons on the first interface in two possible implementations (a first possible implementation and a second possible implementation). In this way, all icons of the application programs in the electronic device may be displayed on the first interface. The following separately exemplarily describes the two possible implementations.

In the first possible implementation, after the electronic device displays the first interface, if the electronic device receives a target input performed by the user on the first interface, the electronic device may update the icons on the first interface.

Optionally, in this embodiment of the present disclosure, the target input may be any possible input such as a left sliding input, a right sliding input, or a downward sliding input performed by the user on the first interface. This may be determined based on an actual use requirement, and is not limited in this embodiment of the present disclosure.

In the second possible implementation, after the electronic device displays the first interface, if the electronic device receives no input performed by the user in first duration, the electronic device may update the icons on the first interface.

Optionally, in this embodiment of the present disclosure, the first duration may be a value preset in the electronic device by the manufacturer of the electronic device, or may be a value preset in the electronic device by the user based on a use requirement of the user by using a setting interface provided by the manufacturer of the electronic device. This may be determined based on an actual use requirement, and is not limited in this embodiment of the present disclosure.

In this embodiment of the present disclosure, the display size of each of the at least two icons may be determined based on the attribute information of the application program indicated by icon. If attribute information of application programs indicated by the at least two icons is different, display sizes of the at least two icons are also different.

Optionally, in this embodiment of the present disclosure, the electronic device may determine the quantity of the at least two display sizes based on attribute information of an application program indicated by an icon in the at least two icons.

Figure 6:
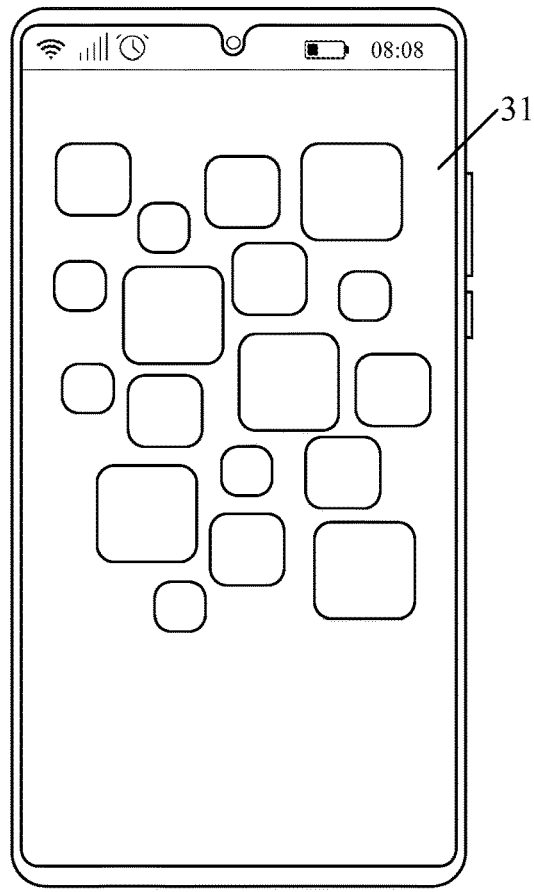
FIG. 6 is a fourth schematic diagram of an application interface in an interface display method according to an embodiment of the present disclosure.

For example, assuming that the attribute information of the application program indicated by the icon in the at least two icons is a use frequency of the application program, and the use frequency of the application program indicated by the icon in the at least two icons includes three use frequencies, the electronic device may display the at least two icons in three display sizes. For example, as shown in FIG. 6, the electronic device displays icons (that is, the at least two icons) on a first interface 31 in three display sizes. That is, the quantity of the at least two display sizes is 3.

Optionally, in this embodiment of the present disclosure, the electronic device may display the at least two icons in another display effect, for example, any possible display effect such as at least two display colors or at least two display shapes. This may be determined based on an actual use requirement, and is not limited in this embodiment of the present disclosure.

In this embodiment of the present disclosure, the at least two icons in the foregoing first interface are displayed in at least two display sizes. Therefore, when the user wants to trigger the electronic device to display an interface of an application program, the user may first trigger, through the first input, the electronic device to display the first interface, and then the user may directly search for an icon of the application program in icons displayed in a specified display size. In this way, a range of searching for the icon of the application program by the user can be narrowed, so that the user can quickly find the icon of the application program, and after the user finds the icon of the application program, the user may trigger the electronic device to display an interface of the application program, thereby reducing time consumed for triggering the electronic device to display the interface of the application program.

Optionally, in this embodiment of the present disclosure, for each of the at least two icons, a display size of the icon may be determined based on attribute information of an application program indicated by the icon. If the attribute information of the application program indicated by the icon is different, the icon may be displayed in a different display size. This may be divided into the following four cases: a case 1, a case 2, a case 3, and a case 4. The following separately exemplarily describes the four cases (the case 1, the case 2, the case 3, and the case 4).

Case 1: In a case that the attribute information of the application program includes the use frequency of the application program, a higher use frequency of the application program may indicate a larger display size of the icon. The icon may be an icon of the application program.

Case 2: In a case that the attribute information of the application program includes the use duration of the application program, longer use duration of the application program may indicate a larger display size of the icon.

Case 3: In a case that the attribute information of the application program includes the duration since the last time of using the application program, shorter duration since the last time of using the application program may indicate a larger display size of the icon.

Case 4: In a case that the attribute information of the application program includes the application type of the application program, if the application type of the application program is a first application type, the display size of the icon may be a first display size; or if the application type of the application program is a second application type, the display size of the icon may be a second display size.

The first display size may be larger than the second display size.

Optionally, in this embodiment of the present disclosure, the first application type may be an application type of an application program most commonly used by the user in the electronic device. The second application type may be an application type in the electronic device other than the first application type.

For example, the first application type may be any possible application type such as a chat type, a shopping type, or a video type. This may be determined based on an actual use requirement, and is not limited in this embodiment of the present disclosure.

For another example, assuming that the first application type is a chat type, the second type may be an application type other than the chat type, such as a shopping type, a financial type, and a music type.

Certainly, in actual implementation, the first application type and the second application type may be any possible application types. This may be determined based on an actual use requirement, and is not limited in this embodiment of the present disclosure.

It should be noted that, in this embodiment of the present disclosure, for ease of description, application programs and icons in the foregoing cases (that is, the case 1, the case 2, the case 3, and the case 4) are described by using an application program and an icon indicating the application program as an example. In actual implementation, each of the at least two icons and an application program indicated by each icon may be applicable to each case in the foregoing embodiment.

In this embodiment of the present disclosure, a use frequency of an application program may indicate a possibility of using the application program by the user. For example, when the use frequency of the application program is higher, the electronic device may determine that the user is more likely to use the application program. Therefore, the electronic device may display an icon of the application program in a larger display size, so that the user can quickly find the application program.

Correspondingly, the use duration of the application program, the duration since the last time of using the application program, and the application type of the application program may also indicate a possibility of using the application program by the user. For example, when the use duration of the application program is greater, the electronic device may determine that the user is more likely to use the application program. When the duration since the last time of using the application program is shorter, the electronic device may determine that the user is more likely to use the application program. When the application program is an application program of the first application type, the electronic device may determine that the user is more likely to use the application program.

Certainly, in actual implementation, the display size of each of the at least two icons may be determined based on a plurality of pieces of attribute information in the use frequency of the application program, the use duration of the application program, the duration since the last time of using the application program, and the application type of the application program. This is not limited in this embodiment of the present disclosure.

In this embodiment of the present disclosure, the use frequency of the application program, the use duration of the application program, the duration since the last time of using the application program, and the application type of the application program may indicate a possibility of using the application program by the user. Therefore, the electronic device determines the display size of the icon of the application program based on at least one of the plurality of pieces of attribute information. In this way, the electronic device can properly display a size of the at least two icons based on an actual use requirement of the user, so that the electronic device can display, in a larger display size, icons that are most likely to be used by the user, and the user can quickly find the icons.

Optionally, in this embodiment of the present disclosure, the first interface may further include a search control. When the user needs to search for an icon of an application program, the user may trigger, by inputting search information in the search control, the electronic device to display the icon of the application program related to the search information, so that the user can quickly find the icon of the application program that the user needs to search for.

For example, after S206, the interface display method provided in this embodiment of the present disclosure may further include the following S207 and S208.

S207. The electronic device obtains search information input by the user in a search control.

S208. The electronic device displays a second interface based on the search information, where the second interface includes at least one fourth icon.

The at least one fourth icon may be an icon of a fourth application program, the fourth application program may be an application program of an application type indicated by the search information, and a display effect of each of the at least one fourth icon may be determined based on attribute information of an application program indicated by one fourth icon.

In this embodiment of the present disclosure, when the user wants to search for an icon of an application program in the electronic device, the user may input information about the application program (that is, the search information) in the search control. In this way, the electronic device may obtain the search information, search for an icon of the application program related to the search information (that is, the at least one fourth icon) in the electronic device based on the search information, and then the user may search the at least one fourth icon for an icon of the application program that the user wants to search for, so that the user can quickly find the icon.

In this embodiment of the present disclosure, the search information may be information related to an application program.

Optionally, in this embodiment of the present disclosure, the search information may be any information related to an application program such as a name of the application program, an application type of the application program, or a keyword of the application program. This may be determined based on an actual use requirement, and is not limited in this embodiment of the present disclosure.

Figure 7A:
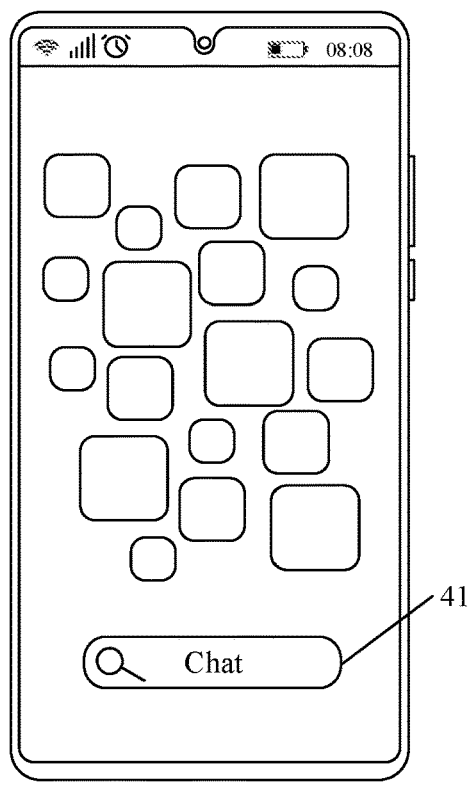
FIG. 7A is a fifth schematic diagram of an application interface in an interface display method according to an embodiment of the present disclosure.
Figure 7B:
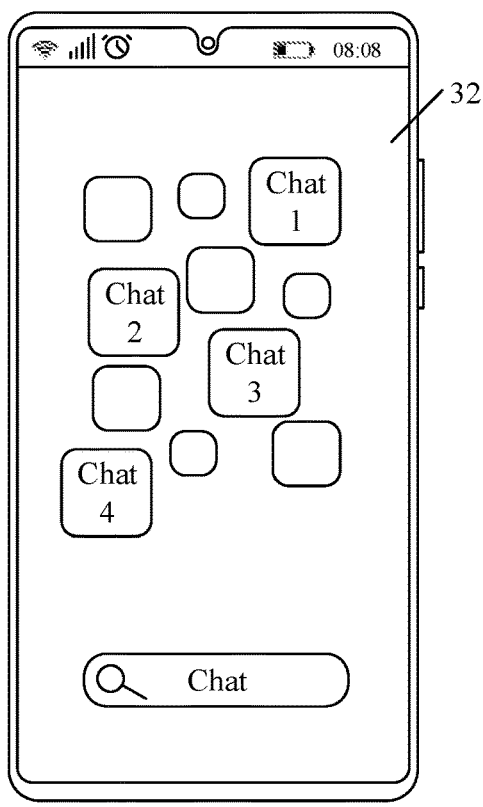
FIG. 7B is a sixth schematic diagram of an application interface in an interface display method according to an embodiment of the present disclosure.

For example, as shown in FIG. 7A, search information input by the user in the search control 41 is "Chat". In this case, the electronic device may search for application programs related to the search information "Chat" in the electronic device based on the search information "Chat", and display icons of the application programs on a second interface 32 shown in FIG. 7B, such as an icon "Chat 1", an icon "Chat 2", an icon "Chat 3", and an icon "Chat 4" shown in FIG. 7B.

Optionally, in this embodiment of the present disclosure, when a quantity of the at least one fourth icon is greater than or equal to 2, the electronic device may display the at least one fourth icon in different display effects (for example, different display sizes or different shapes). A display effect of the at least one fourth icon may be determined based on attribute information of an application program indicated by the at least one fourth icon.

It should be noted that, in this embodiment of the present disclosure, the attribute information of the application program indicated by the at least one fourth icon may be the same as attribute information of application programs indicated by the at least two icons in the foregoing embodiment (that is, a use frequency of the application program, use duration of the application program, duration since the last time of using the application program, and an application type of the application program). To avoid repetition, details are not described herein again.

In this embodiment of the present disclosure, the user may trigger, by inputting the search information in the search control, the electronic device to display the icon (that is, the at least one fourth icon) of the application program related to the search information. Therefore, a range of searching for the icon of the application program by the user in the electronic device can be narrowed. In this way, the user can quickly find the icon of the application program that the user wants to trigger the electronic device to run, so that time consumed for triggering the electronic device to display an interface of the application program can be reduced.

Optionally, in this embodiment of the present disclosure, the first interface may further include at least one classification control, and each classification control may be used to indicate an application type. When the user searches for an application program of an application type in the electronic device, the user may trigger, by performing an input on the classification control that indicates the application type, the electronic device to display an icon of the application program corresponding to the application type in the electronic device.

For example, after S206, the interface display method provided in this embodiment of the present disclosure may further include the following S209 and S210.

S209. The electronic device receives a seventh input performed by the user on a target classification control.

The target classification control is one of the at least one classification control.

S210. The electronic device displays a third interface in response to the seventh input, where the third interface includes at least one fifth icon.

The at least one fifth icon may be an icon of a fifth application program, the fifth application program may be an application program of an application type indicated by the target classification control, and a display effect (for example, a display size or a display shape) of each of the at least one fifth icon may be determined based on attribute information of an application program indicated by one fifth icon.

In this embodiment of the present disclosure, when the user needs to search for an icon of an application program, the user may directly perform an input (that is, the seventh input), based on an application type of the application program (hereinafter referred to as a target application type for short), on a classification control (that is, the target classification control) that indicates the target application type, to trigger the electronic device to display the icon of the application program (that is, the at least one fifth icon) corresponding to the target application type indicated by the target classification control.

In this embodiment of the present disclosure, each of the at least one classification control may be used to indicate an application type.

For example, an application type indicated by a "video" classification control may be "Video", and an application type indicated by a "finance" classification control may be "Finance".

Optionally, in this embodiment of the present disclosure, the at least one classification control may be a preset control in the electronic device. The at least one classification control may be preset in the electronic device by the manufacturer of the electronic device, or may be preset in the electronic device by the user based on a use requirement of the user by using a setting interface provided by the manufacturer of the electronic device. This may be determined based on an actual use requirement, and is not limited in this embodiment of the present disclosure.

Optionally, in this embodiment of the present disclosure, the setting interface may be a setting interface (hereinafter referred to as a target setting interface), and the user may set the at least one classification control in the electronic device by using the target setting interface.

Optionally, in this embodiment of the present disclosure, the application program corresponding to each of the at least one classification control may be preset by the user in the electronic device, or may be determined by the electronic device based on big data. This may be determined based on an actual use requirement, and is not limited in this embodiment of the present disclosure.

In this embodiment of the present disclosure, assuming that the at least one classification control includes a "common" classification control, application programs corresponding to the "common" classification control may include an application program that is preset by the user for the "common" classification control by using the target setting interface, an application program that is preset for the "common" classification control by the electronic device based on a use frequency of the user, and an application program that is preset for the "common" classification control by the electronic device based on download data (for example, a quantity of download times) of the application program in an application market. For example, the application program that is preset by the user for the "common" classification control may be an application program frequently used by the user. The application program that is preset for the "common" classification control by the electronic device based on the use frequency of the user may be an application program with a relatively high use frequency of the user. The application program that is preset for the "common" classification control by the electronic device based on the download data of the application program in the application market may be an application program with a relatively large quantity of download times.

Figure 8:
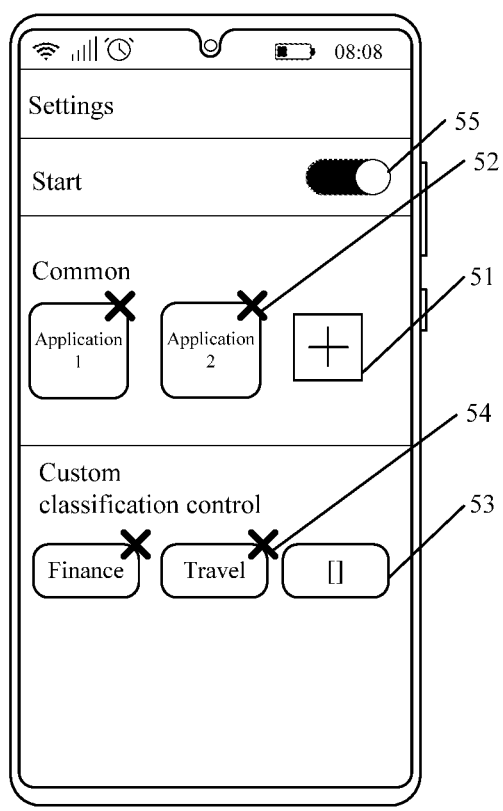
FIG. 8 is a seventh schematic diagram of an application interface in an interface display method according to an embodiment of the present disclosure.

For example, as shown in FIG. 8, FIG. 8 is a schematic diagram of the target setting interface according to an embodiment of the present disclosure. As shown in FIG. 8, the user may trigger, through an input on a first adding control 51, the electronic device to set an application program corresponding to the "common" classification control, or the user may trigger, by through an input on a cancel control 52 on an icon of the application program corresponding to the "common" classification control, the electronic device to cancel the application program corresponding to the "common" classification control. The user may further trigger, through an input on a second adding control 53, the electronic device to set a classification control in the at least one classification control, for example, a "travel" classification control and a "finance" classification control in FIG. 8. The user may trigger, through an input on a deletion control on the classification control, the electronic device to delete the classification control. For example, the user may trigger, through an input on a deletion control 54 on the "travel" classification control, the electronic device to delete the "travel" classification control.

It should be noted that in this embodiment of the present disclosure, the target setting interface may further include an enable control, for example, an enable control 55 in FIG. 8. In a case that the enable control is in an enabled state, the electronic device may display the first interface in response to the third input. In a case that the enable control is in a disabled state, the electronic device does not respond to the third input. In other words, in a case that the enable control is in a disabled state, the electronic device does not display the first interface even if the electronic device receives the third input.

Optionally, in this embodiment of the present disclosure, the at least one classification control may be displayed on the first interface in a scrolling manner.

In this embodiment of the present disclosure, the electronic device may display the at least one classification control on the first interface in a scrolling manner. Therefore, in a case that there is a relatively large quantity of the at least one classification control, it can be ensured that each of the at least one classification control can be displayed on the first interface, so that the user can select, based on a use requirement of the user, a classification control that needs to be used by the user.

Optionally, in this embodiment of the present disclosure, the seventh input may be any possible input such as a single-click input, a double-click input, a long press input, or a re-press input performed by the user on the target classification control. This may be determined based on an actual use requirement, and is not limited in this embodiment of the present disclosure.

In this embodiment of the present disclosure, the re-press input may be an input performed by the user on the target classification control by using pressure greater than or equal to a pressure threshold.

Optionally, in this embodiment of the present disclosure, the pressure threshold may be a value preset in the electronic device by the manufacturer of the electronic device. This may be determined based on an actual use requirement, and is not limited in this embodiment of the present disclosure.

Figure 9A:
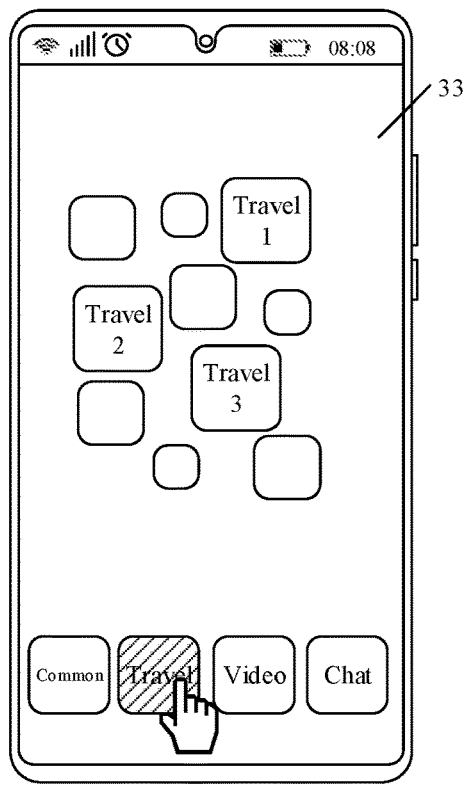
FIG. 9A is an eighth schematic diagram of an application interface in an interface display method according to an embodiment of the present disclosure.
Figure 9B:
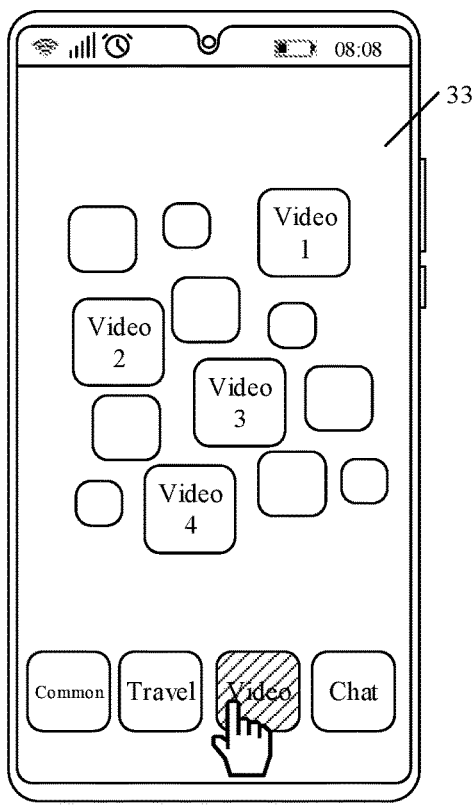
FIG. 9B is a ninth schematic diagram of an application interface in an interface display method according to an embodiment of the present disclosure.

With reference to FIG. 9A and FIG. 9B, the following exemplarily describes S209 and S210.

For example, assuming that the target classification control is a "travel" classification control, the user may trigger, through an input on the "travel" classification control, the electronic device to display a third interface 33 shown in FIG. 9A. The third interface 33 includes a plurality of fifth icons, such as an icon "Travel 1", an icon "Travel 2", and an icon "Travel 3" shown in FIG. 9A. The plurality of fifth icons may be application programs corresponding to a "travel" application type in the electronic device.

For example, assuming that the target classification control is a "video" classification control, the user may trigger, through an input on the "video" classification control, the electronic device to display a third interface 33 shown in FIG. 9B. The third interface 33 includes a plurality of fifth icons, such as an icon "Video 1", an icon "Video 2", an icon "Video 3", and an icon "Video 4" shown in FIG. 9B. The plurality of fifth icons may be application programs corresponding to a "video" application type in the electronic device.

Optionally, in this embodiment of the present disclosure, when a quantity of the at least one fifth icon is greater than or equal to 2, the electronic device may display the at least one fifth icon in different display effects. A display effect of the at least one fifth icon may be determined based on attribute information of an application program indicated by the at least one fifth icon.

It should be noted that, in this embodiment of the present disclosure, the attribute information of the application program indicated by the at least one fifth icon may be the same as attribute information of the application program in the foregoing embodiment (that is, a use frequency of the application program, use duration of the application program, duration since the last time of using the application program, and an application type of the application program). To avoid repetition, details are not described herein again.

In this embodiment of the present disclosure, the user may trigger, through an input on the target classification control, the electronic device to display the icon (that is, the at least one fifth icon) of the application program corresponding to the application type indicated by the target classification control. Therefore, a range of searching for the icon of the application program by the user in the electronic device can be narrowed. In this way, the user can quickly find the icon of the application program that the user wants to trigger the electronic device to run, so that time consumed for triggering the electronic device to display an interface of the application program can be reduced.

Optionally, in this embodiment of the present disclosure, the user may trigger, in another manner, the electronic device to display an interface of an application program indicated by an icon in the at least two icons. For example, if the user wants to trigger an interface of an application program indicated by an icon in the at least two icons on the first interface, the user may first trigger, through an input for the icon (for example, a fourth input in this embodiment of this disclosure), the electronic device to display a start control on the first interface, and then the user trigger, through an input for the icon and the start control (for example, a fifth input in this embodiment of this disclosure), the electronic device to display the interface of the application program indicated by the icon.

It can be understood that in this embodiment of the present disclosure, in a case that the electronic device displays the first interface, the user may trigger the electronic device to display the interface of the application program in the foregoing manner. For example, after the electronic device exits the interface of the first application program, and returns to the first interface, the user may trigger, in the foregoing manner, the electronic device to display the interface of the application program. Certainly, the user may trigger, in any other possible occasion, the electronic device to display the interface of the application program in the foregoing manner. This may be determined based on an actual use requirement, and is not limited in this embodiment of the present disclosure.

Figure 10:
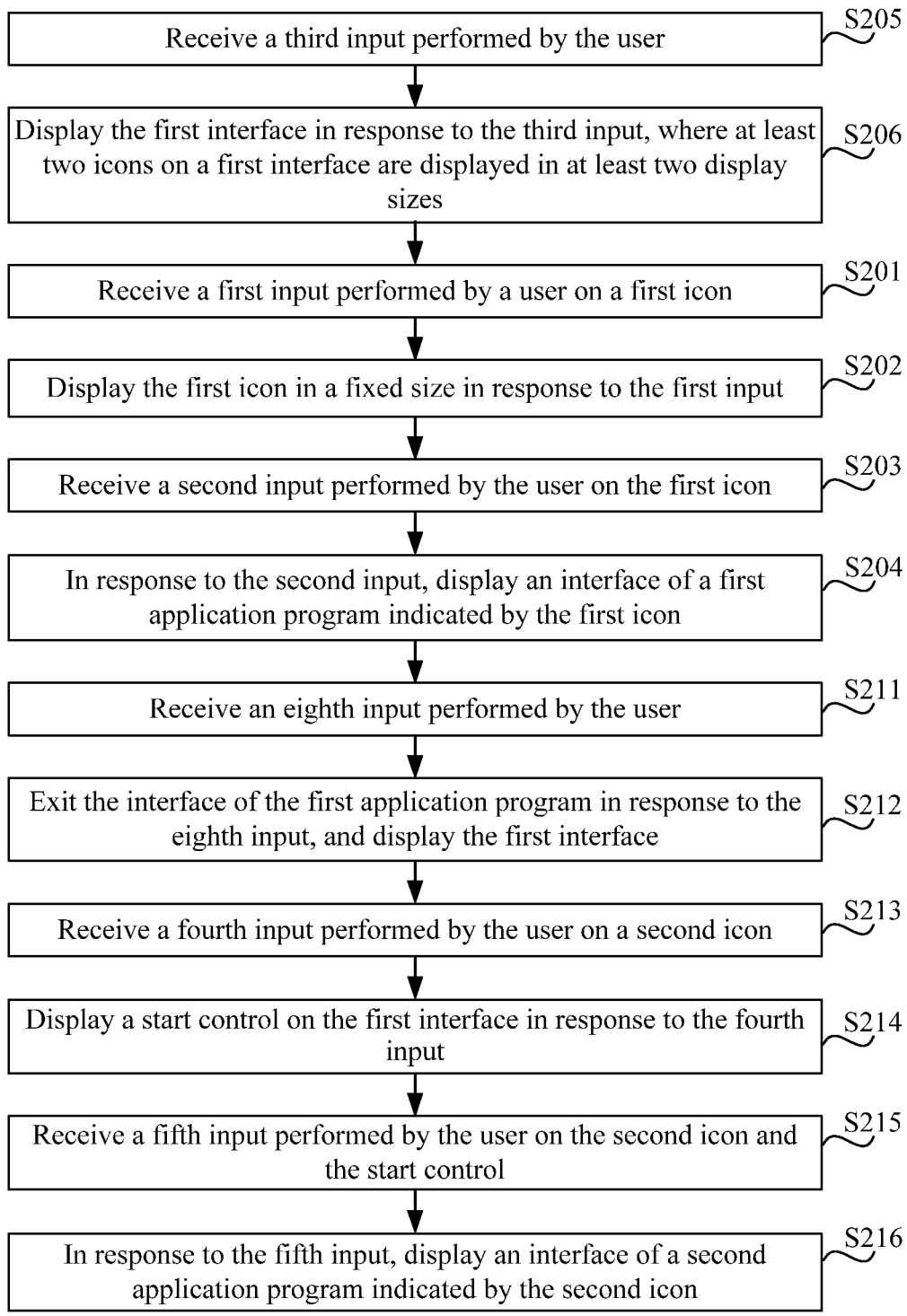
FIG. 10 is a third schematic diagram of an interface display method according to an embodiment of the present disclosure.

For example, with reference to FIG. 5, as shown in FIG. 10, after S204, the interface display method provided in this embodiment of the present disclosure may further include the following S211 to S216.

S211. The electronic device receives an eighth input performed by the user.

S212. The electronic device exits the interface of the first application program in response to the eighth input, and displays the first interface.

S213. The electronic device receives a fourth input performed by the user for a second icon.

The second icon may be an icon in the at least two icons.

S214. The electronic device displays a start control on the first interface in response to the fourth input.

S215. The electronic device receives a fifth input performed by the user for the second icon and the start control.

S216: In response to the fifth input, the electronic device displays an interface of a second application program indicated by the second icon.

It should be noted that a performing sequence between S213-S216 and S201-S204 may not be limited in this embodiment of the present disclosure. That is, in this embodiment of the present disclosure, S201-S204 may be performed before S213-S216; or S213-S216 may be performed before S201-S204. The foregoing FIG. 10 is described by using an example in which S201-to S204 is performed before S213-S216. In addition, in other possible embodiments of the present disclosure, S213-S216 may be directly performed without including S211 and S212. This is not specifically limited in this embodiment of the present disclosure.

In this embodiment of the present disclosure, after the electronic device displays the interface of the first application program, the user may trigger, through the eighth input, the electronic device to exit the interface of the first application program, and display the first interface. Then, the user may trigger, through an input for the second icon (that is, the fourth input), the electronic device to display the start control on the first interface, and after the electronic device displays the start control, the user may trigger, through an input on the second icon and the start control, the electronic device to display the interface of the second application program indicated by the second icon.

In this embodiment of the present disclosure, the eighth input may be an input performed by the user on an "exit" virtual navigation key of the electronic device, or may be an input performed by the user on an exit control of the interface of the first application program, or the like. This may be determined based on an actual use requirement, and is not limited in this embodiment of the present disclosure.

It can be understood that, in this embodiment of the present disclosure, the start control may be used to trigger the electronic device to run an application program, and display an interface of the application program.

Optionally, in this embodiment of the present disclosure, the fourth input and the fifth input may include two forms, that is, a first form and a second form. The following describes the two forms (the first form and the second form) of the fourth input and the fifth input as an example.

In the first form, the fourth input and the fifth input may be two consecutive inputs performed by the user in the electronic device.

In this embodiment of the present disclosure, for the first form, the user may first trigger, through the fourth input, the electronic device to display the start control, and then trigger, through the fifth input, the electronic device to display the interface of the second application program indicated by the second icon.

Optionally, for the first form, the fourth input may be any possible input performed by the user for the second icon, such as a single-click input, a double-click input, or a long-press input. This may be determined based on an actual use requirement, and is not limited in this embodiment of the present disclosure.

Optionally, for the first form, the fifth input may be an input of dragging the second icon to the start control by the user; or the fifth input may be a single-click input performed by the user for the second icon and the start control within preset duration. This may be determined based on an actual use requirement, and is not limited in this embodiment of the present disclosure.

In the second form, the fourth input and the fifth input may be two consecutive inputs performed on a display screen of the electronic device without leaving of a finger of the user.

Optionally, in the second form, the user may first perform an input on the second icon to trigger the electronic device to display the start control, and the finger of the user directly drags the second icon to the start control without leaving the display screen of the electronic device.

Certainly, in actual implementation, the fourth input and the fifth input may be in any other possible form. This may be determined based on an actual use requirement, and is not limited in this embodiment of the present disclosure.

Optionally, in this embodiment of the present disclosure, a display size of the second icon is smaller than the fixed size, and the fifth input is an input of dragging the second icon to the start control. In a process of dragging the second icon to the start control, the display size of the second icon increases with a decrease of a target distance, and the target distance may be a distance between the second icon and the start control.

Figure 11A:
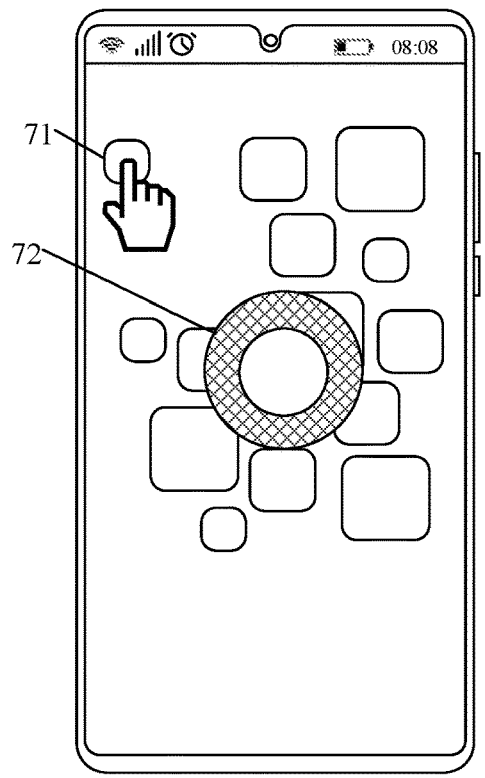
FIG. 11A is a tenth schematic diagram of an application interface in an interface display method according to an embodiment of the present disclosure.

For example, it is assumed that the application program indicated by the second icon is a "camera" application program, the display size of the second icon is smaller than the fixed size, the fourth input is a single-click input performed by the user for the second icon, and the fifth input is an input of dragging the second icon to the start control by the user. When the user clicks an icon 71 (that is, the second icon) shown in FIG. 11A, the terminal may display a start control 72 shown in FIG. 11A. After the electronic device displays the start control 72, as shown in FIG. 11B, the user may directly drag the icon 71 to the start control 72, and then the electronic device may display, in response to the input, an interface of an application program indicated by an icon "camera" shown in FIG. 11C.

Figure 11B:
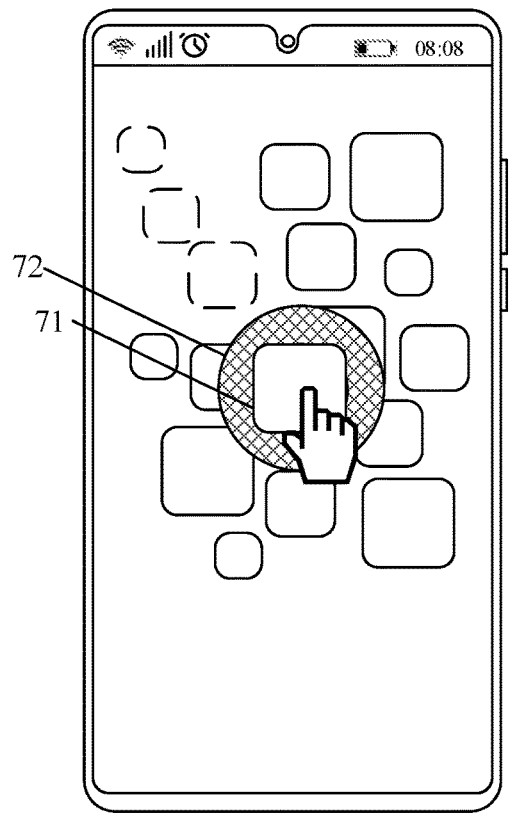
FIG. 11B is a eleventh schematic diagram of an application interface in an interface display method according to an embodiment of the present disclosure.
Figure 11C:
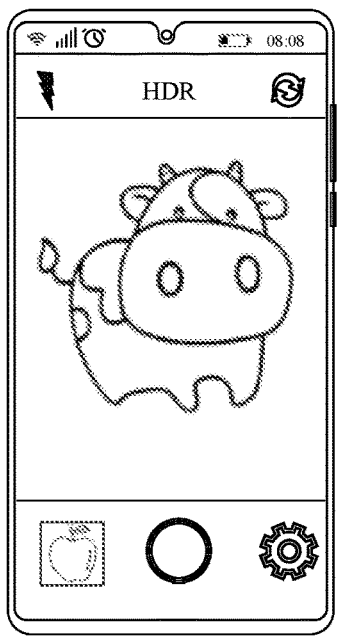
FIG. 11C is a twelfth schematic diagram of an application interface in an interface display method according to an embodiment of the present disclosure.

For example, as shown in FIG. 11B, in a process of dragging the icon 71 by the user, a display size of the icon 71 may increase with a decrease of a distance between the icon 71 and the start control 72.

In this embodiment of the present disclosure, the user may trigger, through an input on the second icon, the electronic device to display the start control, and may trigger, through an input on the second icon and the start control, the electronic device to display the interface of the second application program. Therefore, the user may trigger, in different manners, the electronic device to display the interface of the application program, so that the user can trigger, in a proper trigger manner based on a use habit of the user, the electronic device to display the interface of the application program, thereby improving flexibility of operating the electronic device.

Optionally, in this embodiment of the present disclosure, if the user wants to trigger the electronic device to uninstall an application program, the user may directly perform an input an icon indicating the application program on the first interface, and trigger the electronic device to uninstall the application program.

It can be understood that in this embodiment of the present disclosure, the user may uninstall the application program in the foregoing manner in a case that the electronic device displays the first interface. For example, after the electronic device exits the interface of the first application program, and returns to the first interface, the user may trigger the electronic device to uninstall the application program in the foregoing manner, or may trigger the electronic device to uninstall the application program in the foregoing manner after the electronic device displays the first interface. Certainly, the user may trigger, in any other possible occasion, the electronic device to uninstall the application program in the foregoing manner. This may be determined based on an actual use requirement, and is not limited in this embodiment of the present disclosure.

Figure 12:
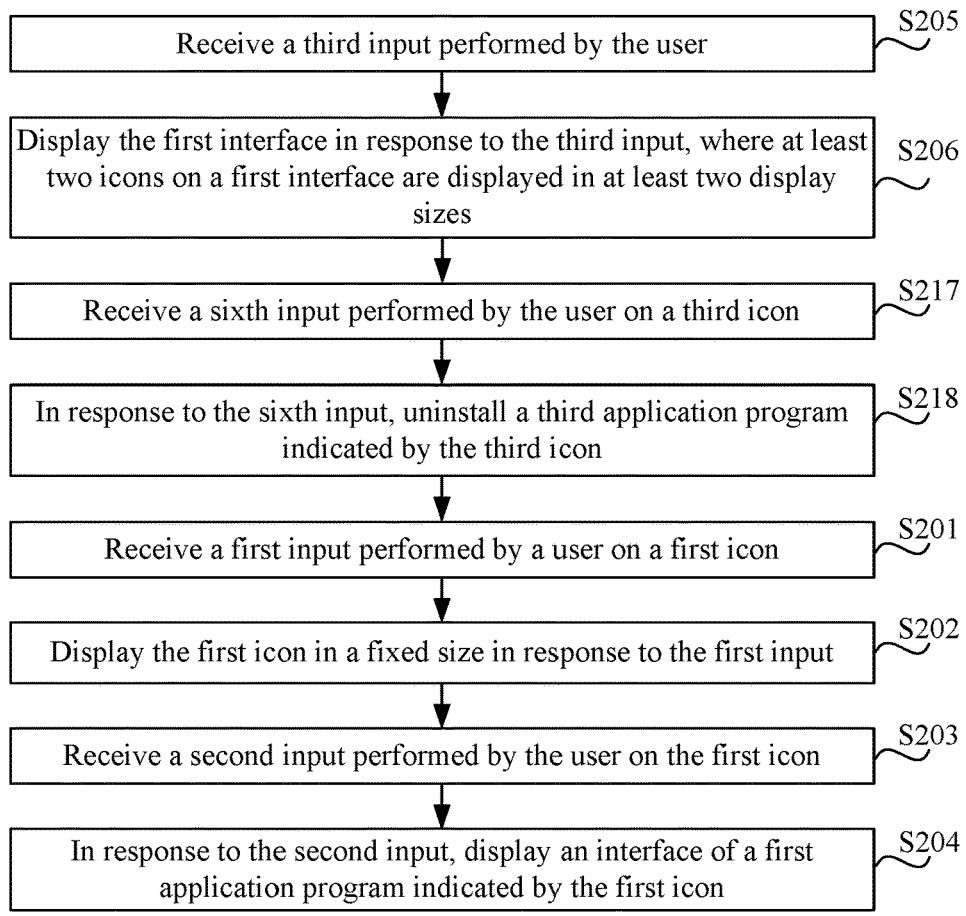
FIG. 12 is a fourth schematic diagram of an interface display method according to an embodiment of the present disclosure.

For example, with reference to FIG. 5, as shown in FIG. 12, after S206, the interface display method provided in this embodiment of the present disclosure may further include the following S217 and S218.

S217. The electronic device receives a sixth input performed by the user for a third icon.

The third icon may be an icon in the at least two icons.

S218. In response to the sixth input, the electronic device uninstalls a third application program indicated by the third icon.

The sixth input may be an input of dragging the third icon beyond a target area, and the target area may be an area in which the at least two icons are located on the first interface.

Optionally, in this embodiment of the present disclosure, the sixth input may be an input performed on an uninstall control on the third icon.

It should be noted that a performing sequence between S217-S218 and S201-S204 may not be limited in this embodiment of the present disclosure. That is, in this embodiment of the present disclosure, S201-S204 may be performed before S217-S218, or S217-S218 may be performed before S201-S204. The foregoing FIG. 12 is described by using an example in which S217-S218 is performed before S201-S204.

In this embodiment of the present disclosure, after the electronic device displays the first interface, if the user wants to trigger the electronic device to uninstall an application program indicated by the third icon, the user may trigger, through the sixth input, the electronic device to uninstall the third application program indicated by the third icon.

In this embodiment of the present disclosure, the sixth input may include two manners: a first manner and a second manner. The following exemplarily describes the two manners (the first manner and the second manner).

In the first manner, the sixth input may be an input performed by the user on the uninstall control on the third icon.

For the first manner, the user may first trigger, through a ninth input, the electronic device to display an uninstall identifier on each of the at least two icons, and then the user may trigger, through an input on the uninstall control on the third icon (that is, the sixth input), the electronic device to uninstall the third application program indicated by the third icon.

Optionally, in this embodiment of the present disclosure, the ninth input may be any possible input performed by the user in a blank area on the first interface, such as a long-press input or a re-press input. This may be determined based on an actual use requirement, and is not limited in this embodiment of the present disclosure.

Optionally, for the first manner, the sixth input may be any possible input performed by the user on the uninstall control on the third icon, such as a single-click input or a double-click input. This may be determined based on an actual use requirement, and is not limited in this embodiment of the present disclosure.

Figure 13A:
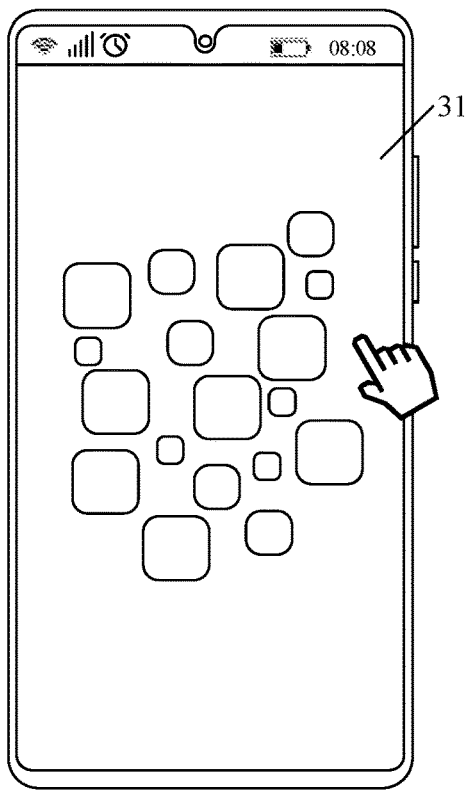
FIG. 13A is a thirteenth schematic diagram of an application interface in an interface display method according to an embodiment of the present disclosure.
Figure 13B:
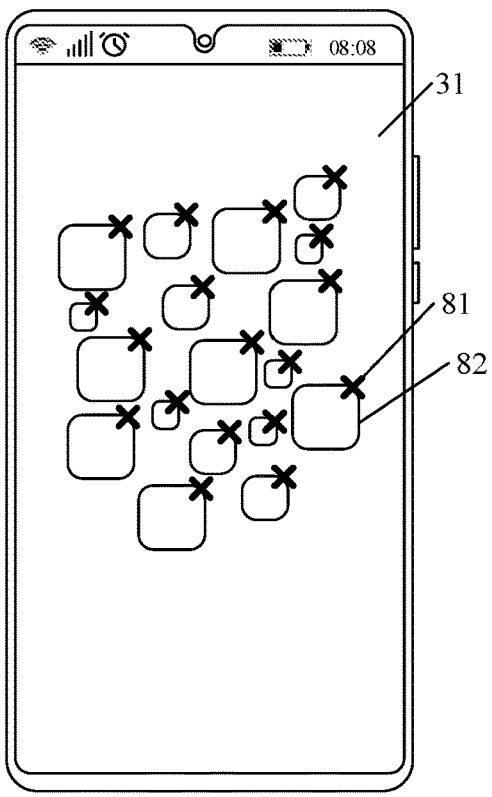
FIG. 13B is a fourteenth schematic diagram of an application interface in an interface display method according to an embodiment of the present disclosure.

For example, it is assumed that the ninth input is a long-press input performed by the user in a blank area on the first interface, and the sixth input is a single-click input performed by the user on the uninstall control on the third icon. As shown in FIG. 13A, when the user presses a blank area on the first interface 31 for a long time, in response to the input, the electronic device may display one uninstall control 81 shown in FIG. 13B on each of the at least two icons. Then the user may trigger, through a single-click input on an uninstall identifier on a third icon 82, the electronic device to uninstall the third application program indicated by the third icon 82.

In the second manner, the sixth input may be an input of dragging the third icon beyond the target area by the user.

For the second manner, when the user drags the third icon, the electronic device may display the target area on the first interface. When the user drags the third icon beyond the target area, the electronic device may uninstall the third application program indicated by the third icon.

Figure 14A:
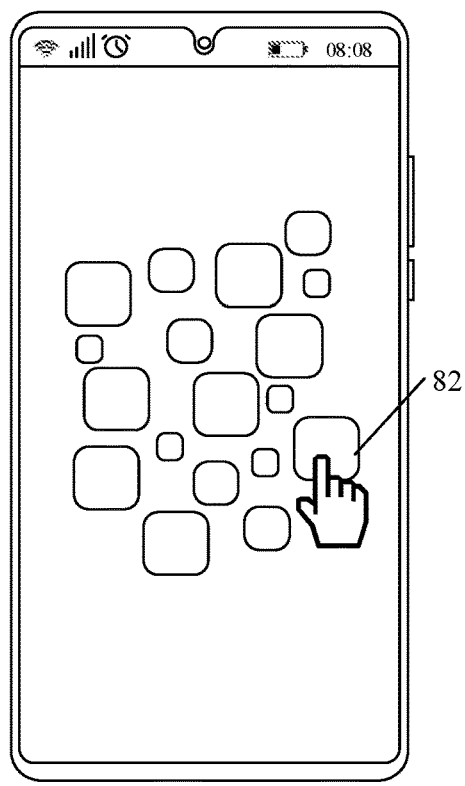
FIG. 14A is a fifteenth schematic diagram of an application interface in an interface display method according to an embodiment of the present disclosure.
Figure 14B:
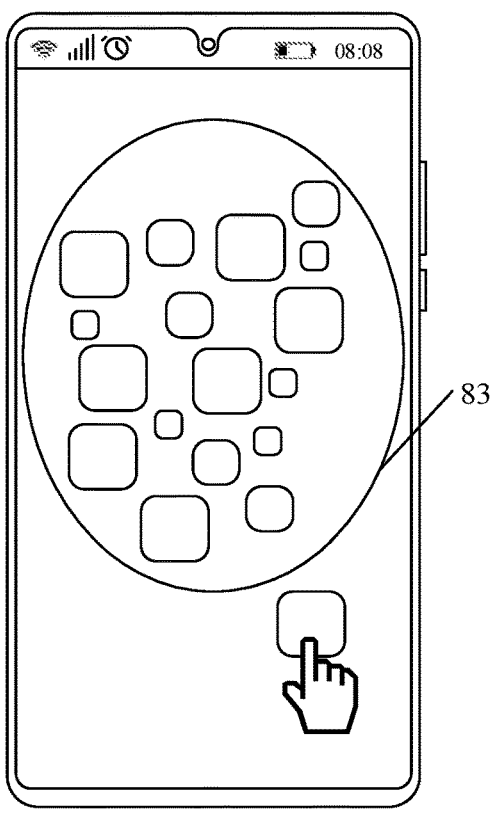
FIG. 14B is a sixteenth schematic diagram of an application interface in an interface display method according to an embodiment of the present disclosure.

For example, as shown in FIG. 14A, when the user drags the third icon 82, the electronic device may display a target area 83 shown in FIG. 14B on the first interface 31. When the user drags the third icon 82 beyond the target area 83, the electronic device may uninstall the third application program indicated by the third icon 82.

In this embodiment of the present disclosure, after the electronic device displays the first interface, the user may directly trigger, through the sixth input for the third icon, the electronic device to uninstall the third application program indicated by the third icon. In this way, the user can quickly trigger, on the first interface, the electronic device to uninstall the application program, so that operation of the user on the electronic device can be relatively convenient.

It should be noted that, in this embodiment of the present disclosure, the interface display methods shown in the foregoing accompanying drawings are described by using an example with reference to one of the accompanying drawings in this embodiment of the present disclosure. In actual implementation, the interface display methods shown in the foregoing accompanying drawings may be further implemented with reference to any other accompanying drawings that may be combined shown in the foregoing embodiments. Details are not described herein again.

Figure 15:
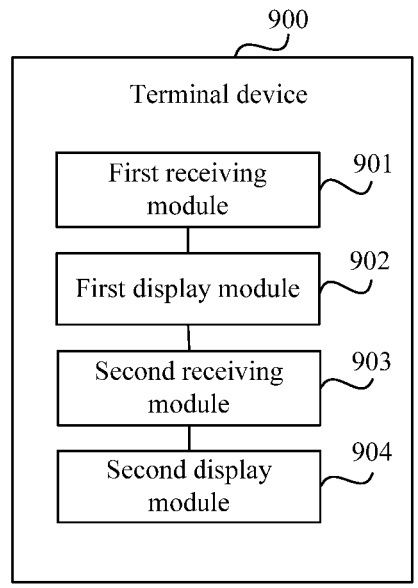
FIG. 15 is a schematic structural diagram of an electronic device according to an embodiment of the present disclosure.

As shown in FIG. 15, an embodiment of the present disclosure provides an electronic device 900. The electronic device 900 may include:

a first receiving module 901, configured to receive a first input performed by a user for a first icon, where the first icon is an icon whose display size is smaller than a fixed size in at least two icons on a first interface;

a first display module 902, configured to display the first icon in the fixed size in response to the first input;

a second receiving module 903, configured to receive a second input performed for the first icon; and a second display module 904, configured to: in response to the second input, display an interface of a first application program indicated by the first icon.

Optionally, the electronic device further includes:

a third receiving module, configured to receive a third input performed by the user; and a third display module, configured to display the first interface in response to the third input, where the at least two icons on the first interface are displayed in at least two display sizes, and a display size of each of the at least two icons corresponds to attribute information of an application program indicated by the icon; and the attribute information of the application program includes at least one of the following: a use frequency of the application program, use duration of the application program, duration since the last time of using the application program, or an application type of the application program.

Optionally, in a case that the attribute information of the application program includes the use frequency of the application program, a higher use frequency of the application program indicates a larger display size of the icon (indicating the icon of the application program); or in a case that the attribute information of the application program includes the use duration of the application program, longer use duration of the application program indicates a larger display size of the icon; or in a case that the attribute information of the application program includes the duration since the last time of using the application program, shorter duration since the last time of using the application program indicates a larger display size of the icon; or in a case that the attribute information of the application program includes the application type of the application program, if the application type of the application program is a first application type, the display size of the icon is a first display size; or if the application type of the application program is a second application type, the display size of the icon is a second display size, where the first display size is larger than the second display size.

Optionally, the electronic device further includes:
a fourth receiving module, configured to receive a fourth input performed by the user for a second icon, where the second icon is an icon in the at least two icons;
a fourth display module, configured to display a start control on the first interface in response to the fourth input;
a fifth receiving module, configured to receive a fifth input performed by the user for the second icon and the start control; and
a fifth display module, configured to: in response to the fifth input, display an interface of a second application program indicated by the second icon.

Optionally, a display size of the second icon is smaller than the fixed size, and the fifth input is an input of dragging the second icon to the start control; and
in a process of dragging the second icon to the start control, the display size of the second icon increases with a decrease of a target distance, and the target distance is a distance between the second icon and the start control.

Optionally, the electronic device further includes:
a sixth receiving module, configured to receive a sixth input performed by the user for a third icon, where the third icon is an icon in the at least two icons; and
a processing module, configured to: in response to the sixth input, uninstall a third application program indicated by the third icon, where
the sixth input is an input of dragging the third icon beyond a target area, and the target area is an area in which the at least two icons are located on the first interface.

The electronic device provided in this embodiment of the present disclosure can implement the processes performed by the electronic device in the foregoing interface display method embodiment, and can achieve a same technical effect. To avoid repetition, details are not described herein again.

This embodiment of the present disclosure provides an electronic device. The electronic device may display an icon of an application program in a display size smaller than the fixed size. Therefore, a quantity of icons that may be displayed by the electronic device on the first interface may be greater than a quantity of icons displayed by the electronic device in the fixed size. In this way, when the user needs to trigger the electronic device to display an interface of an application program (for example, the first application program), the user may first trigger the electronic device to display an icon of the application program in the fixed size on the first interface, and then the user may trigger the electronic device to display the interface of the application program, that is, the user may trigger the electronic device to display the interface of the application program without searching for the icon of the application program on a plurality of interfaces of the electronic device, so that time consumed in a process of triggering the electronic device by the user to display the interface of the application program is reduced, and the user can quickly trigger the electronic device to display the interface of the application program.

Figure 16:
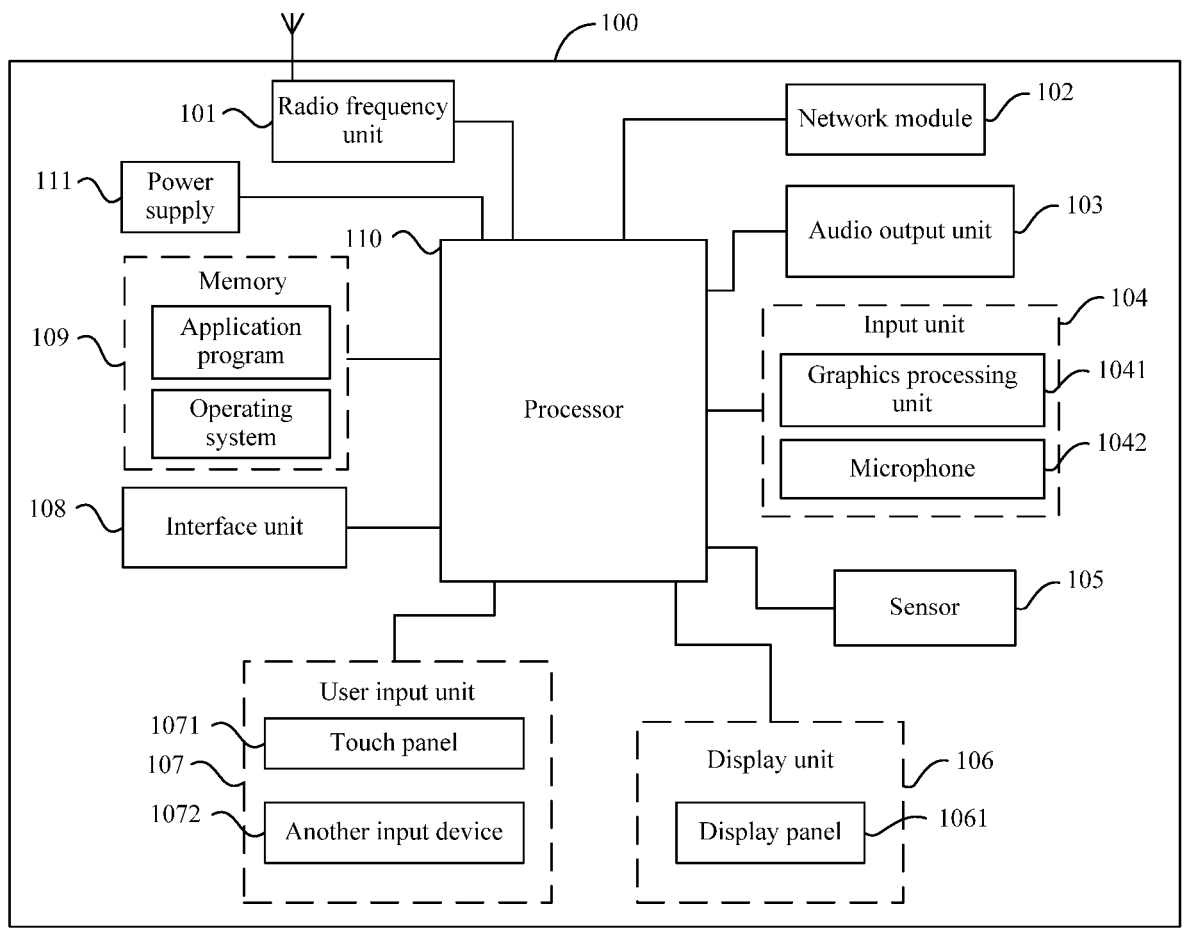
FIG. 16 is a schematic diagram of hardware of an electronic device according to an embodiment of the present disclosure.

FIG. 16 is a schematic diagram of hardware of an electronic device according to the embodiments of the present disclosure. As shown in FIG. 16, an electronic device 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art may understand that the structure of the electronic device shown in FIG. 16 constitutes no limitation on the electronic device. The electronic device may include more or fewer components than those shown in the figure, or a combination of some components, or an arrangement of different components. In this embodiment of the present disclosure, the electronic device includes, but is not limited to, a mobile phone, a tablet computer, a notebook computer, a palmtop computer, a vehicle-mounted terminal, a wearable device, a pedometer, or the like.

The user input unit 107 is configured to receive a first input performed by a user for a first icon. The display unit 106 is configured to display the first icon in a fixed size in response to the first input received by the user input unit 107. The user input unit 107 is further configured to receive a second input performed by the user for the first icon displayed by the display unit 106 in the fixed size. The display unit 106 may be further configured to: in response to the second input received by the user input unit 107, display an interface of a first application program indicated by the first icon. The first icon is an icon whose display size is smaller than the fixed size in at least two icons on a first interface.

This embodiment of the present disclosure provides an electronic device. The electronic device may display an icon of an application program in a display size smaller than the fixed size. Therefore, a quantity of icons that may be displayed by the electronic device on the first interface may be greater than a quantity of icons displayed by the electronic device in the fixed size. In this way, when the user needs to trigger the electronic device to display an interface of an application program (for example, the first application program), the user may first trigger the electronic device to display an icon of the application program in the fixed size on the first interface, and then the user may trigger the electronic device to display the interface of the application program, that is, the user may trigger the electronic device to display the interface of the application program without searching for the icon of the application program on a plurality of interfaces of the electronic device, so that time consumed in a process of triggering the electronic device by the user to display the interface of the application program is reduced, and the user can quickly trigger the electronic device to display the interface of the application program.

It can be understood that, in the embodiments of the present disclosure, a receiving module (for example, the first receiving module) in the schematic structural diagram of the electronic device in the foregoing embodiment (for example, FIG. 16) may be implemented by using the foregoing user input unit 107, and a display module (for example, the first display module) in the schematic structural diagram of the electronic device in the foregoing embodiment may be implemented by using the foregoing display unit 106.

It should be understood that, in this embodiment of the present disclosure, the radio frequency unit 101 may be configured to receive and send information or a signal in a call process. For example, after receiving downlink data from a base station, the radio frequency unit 101 sends the downlink data to the processor 110 for processing. In addition, the radio frequency unit 101 sends uplink data to the base station. Usually, the radio frequency unit 101 includes but is not limited to an antenna, at least one amplifier, a transceiver, a coupler, a low noise amplifier, a duplexer, and the like. In addition, the radio frequency unit 101 may further communicate with another communications device through a wireless communication system and network.

The electronic device provides users with wireless broadband Internet access through the network module 102, for example, helps users receive and send e-mails, browse web pages, and access streaming media.

The audio output unit 103 can convert audio data received by the radio frequency unit 101 or the network module 102 or stored in the memory 109 into an audio signal, and output the audio signal into sound. In addition, the audio output unit 103 may further provide an audio output (for example, a call signal received voice, or a message received voice) related to a function implemented by the electronic device 100. The audio output unit 103 includes a speaker, a buzzer, a telephone receiver, and the like.

The input unit 104 is configured to receive an audio signal or a video signal. The input unit 104 may include a graphics processing unit (GPU) 1041 and a microphone 1042, and the graphics processing unit 1041 processes image data of a still picture or video obtained by an image capture apparatus (such as a camera) in a video capture mode or an image capture mode. A processed image frame may be displayed on the display unit 106. The image frame processed by the graphics processing unit 1041 may be stored in the memory 109 (or another storage medium) or sent via the radio frequency unit 101 or the network module 102. The microphone 1042 may receive a sound and can process such sound into audio data. Processed audio data may be converted, in a call mode, into a format that can be sent to a mobile communication base station by using the radio frequency unit 101 for output.

The electronic device 100 further includes at least one sensor 105, for example, a light sensor, a motor sensor, and another sensor. The light sensor includes an ambient light sensor and a proximity sensor. The ambient light sensor can adjust brightness of a display panel 1061 according to ambient light brightness. The proximity sensor can switch off the display panel 1061 and/or backlight when the electronic device 100 moves close to an ear. As a type of the motion sensor, an accelerometer sensor may detect an acceleration value in each direction (generally, three axes), and detect a value and a direction of gravity when the accelerometer sensor is static, and may be used in an application for recognizing a posture of the electronic device (such as screen switching between landscape and portrait modes, a related game, or magnetometer posture calibration), a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information entered by a user or information provided for a user. The display unit 106 may include a display panel 1061. The display panel 1061 may be configured in a form of a liquid crystal display (LCD), an organic light-emitting diode (OLED), or the like.

The user input unit 107 can be configured to receive entered number or character information, and generate key signal input related to user settings and function control of the electronic device. The user input unit 107 includes a touch panel 1071 and another input device 1072. The touch panel 1071 is also referred to as a touchscreen, and may collect a touch operation performed by a user on or near the touch panel 1071 (such as an operation performed by a user on the touch panel 1071 or near the touch panel 1071 by using any proper object or accessory, such as a finger or a stylus). The touch panel 1071 may include two parts: a touch detection apparatus and a touch controller. The touch detection device detects a touch position of the user, detects a signal brought by the touch operation, and sends the signal to the touch controller. The touch controller receives touch information from the touch detection device, converts the touch information into touch point coordinates, sends the touch point coordinates to the processor 110, and receives and executes a command sent by the processor 110. In addition, the touch panel 1071 may be of a resistive type, a capacitive type, an infrared type, a surface acoustic wave type, or the like. In addition to the touch panel 1071, the user input unit 107 may further include other input devices 1072. The another input device 1072 may include, but is not limited to, a physical keyboard, a function key (for example, a volume control key or a switch key), a trackball, a mouse, and a joystick. Details are not described herein again.

Optionally, the touch panel 1071 may cover the display panel 1061. When detecting the touch operation on or near the touch panel 1071, the touch panel 1071 transmits the touch operation to the processor 110 to determine a type of a touch event, and then the processor 110 provides corresponding visual output on the display panel 1061 based on the type of the touch event. Although in FIG. 16, the touch panel 1071 and the display panel 1061 are configured as two independent components to implement input and output functions of the electronic device, in some embodiments, the touch panel 1071 and the display panel 1061 can be integrated to implement the input and output functions of the electronic device. Details are not limited herein.

The interface unit 108 is an interface for connecting an external apparatus and the electronic device 100. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 108 can be configured to receive input from an external apparatus (for example, data information and power) and transmit the received input to one or more elements in the electronic device 100, or can be configured to transmit data between the electronic device 100 and the external apparatus.

The memory 109 may be configured to store a software program and various data. The memory 109 may mainly include a program storage area and a data storage area. The program storage area may store an operating system, an application program required by at least one function (such as a sound play function or an image play function), and the like. The data storage area may store data (such as audio data or an address book) created based on use of the mobile phone, and the like. In addition, the memory 109 may include a high-speed random access memory, and may further include a nonvolatile memory, for example, at least one magnetic disk storage device, a flash storage device, or another volatile solid-state storage device.

The processor 110 is a control center of the electronic device and connects all parts of the electronic device using various interfaces and circuits. By running or executing software programs and/or modules stored in the memory 109 and by calling data stored in the memory 109, the processor 110 implements various functions of the electronic device and processes data, thus performing overall monitoring on the electronic device. The processor 110 may include one or more processing units. Optionally, the processor 110 may integrate an application processor and a modem processor. The application processor mainly processes an operating system, a user interface, an application program, and the like. The modem processor mainly processes wireless communication. It can be understood that, alternatively, the modem processor may not be integrated into the processor 110.

The electronic device 100 may further include the power supply 111 (such as a battery) supplying power to each component. Preferably, the power supply 111 may be logically connected to the processor 110 by using a power management system, so as to implement functions such as charging management, discharging management and power consumption management by using the power management system.

In addition, the electronic device 100 includes some functional modules not shown. Details are not described herein.

Optionally, an embodiment of the present disclosure further provides an electronic device, including the processor 110 and the memory 109 shown in FIG. 16, and a computer program that is stored in the memory 109 and executable on the processor 110. When the computer program is executed by the processor 110, the foregoing processes of the interface display method embodiment are implemented and a same technical effect can be achieved. To avoid repetition, details are not described herein again.

The embodiments of the present disclosure further provide a non-transitory computer-readable storage medium. The non-transitory computer-readable storage medium stores a computer program, where when the computer program is executed by a processor, the processes of the embodiments of the above interface display method are implemented, and the same technical effect can be achieved. To avoid repetition, details are not described herein again. The non-transitory computer-readable storage medium may include a read-only memory (ROM), a random access memory (RAM), a magnetic disk, an optical disc, or the like.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing an electronic device (which may be a mobile phone, a computer, a server, an air conditioner, a network device, or the like) to perform the methods in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

What is claimed is:

1. An interface display method, applied to an electronic device, wherein the method comprises:
   receiving a first input performed by a user for a first icon, wherein the first icon is an icon whose display size is smaller than a fixed size in at least two icons on a first interface;
   displaying the first icon in the fixed size in response to the first input;
   receiving a second input performed by the user for the first icon; and
   in response to the second input, displaying an interface of a first application program indicated by the first icon; wherein
   the at least two icons are displayed in at least two display sizes, each of the at least two display sizes corresponds to one display level of an icon; a number of inputs of the first input is determined based on a display level corresponding to a display size of the first icon.

2. The method according to claim 1, wherein before the receiving a first input performed by a user for a first icon, the method further comprises:
   receiving a third input performed by the user; and
   displaying the first interface in response to the third input, wherein the at least two icons on the first interface are displayed in at least two display sizes, and a display size of each of the at least two icons corresponds to attribute information of an application program indicated by icon; and
   the attribute information of the application program comprises at least one of: a use frequency of the application program, use duration of the application program, duration since the last time of using the application program, or an application type of the application program.

3. The method according to claim 2, wherein for each of the at least two icons,
   in a case that the attribute information of the application program comprises the use frequency of the application program, a higher use frequency of the application program indicates a larger display size of the icon; or
   in a case that the attribute information of the application program comprises the use duration of the application program, longer use duration of the application program indicates a larger display size of the icon; or
   in a case that the attribute information of the application program comprises the duration since the last time of using the application program, shorter duration since the last time of using the application program indicates a larger display size of the icon; or
   in a case that the attribute information of the application program comprises the application type of the application program, if the application type of the application program is a first application type, the display size of the icon is a first display size; or if the application type of the application program is a second application type, the display size of the icon is a second display size, wherein the first display size is larger than the second display size.

4. The method according to claim 1, wherein the method further comprises:
receiving a fourth input performed by the user for a second icon, wherein the second icon is an icon in the at least two icons;
displaying a start control on the first interface in response to the fourth input;
receiving a fifth input performed by the user for the second icon and the start control; and
in response to the fifth input, displaying an interface of a second application program indicated by the second icon.

5. The method according to claim 4, wherein a display size of the second icon is smaller than the fixed size, and the fifth input is an input of dragging the second icon to the start control; and
in a process of dragging the second icon to the start control, the display size of the second icon increases with a decrease of a target distance, and the target distance is a distance between the second icon and the start control.

6. The method according to claim 1, wherein the method further comprises:
receiving a sixth input performed by the user for a third icon, wherein the third icon is an icon in the at least two icons; and
in response to the sixth input, uninstalling a third application program indicated by the third icon, wherein
the sixth input is an input of dragging the third icon beyond a target area, and the target area is an area in which the at least two icons are located on the first interface.

7. An electronic device, comprising a processor, a memory, and a computer program that is stored in the memory and executable on the processor, wherein the computer program, when executed by the processor, causes the electronic device to perform:
receiving a first input performed by a user for a first icon, wherein the first icon is an icon whose display size is smaller than a fixed size in at least two icons on a first interface;
displaying the first icon in the fixed size in response to the first input;
receiving a second input performed by the user for the first icon; and
in response to the second input, displaying an interface of a first application program indicated by the first icon; wherein
the at least two icons are displayed in at least two display sizes, each of the at least two display sizes corresponds to one display level of an icon; a number of inputs of the first input is determined based on a display level corresponding to a display size of the first icon.

8. The electronic device according to claim 7, wherein the computer program, when executed by the processor, causes the electronic device further to perform:
receiving a third input performed by the user; and
displaying the first interface in response to the third input, wherein the at least two icons on the first interface are displayed in at least two display sizes, and a display size of each of the at least two icons corresponds to attribute information of an application program indicated by icon; and
the attribute information of the application program comprises at least one of: a use frequency of the application program, use duration of the application program, duration since the last time of using the application program, or an application type of the application program.

9. The electronic device according to claim 8, wherein for each of the at least two icons,
in a case that the attribute information of the application program comprises the use frequency of the application program, a higher use frequency of the application program indicates a larger display size of the icon; or
in a case that the attribute information of the application program comprises the use duration of the application program, longer use duration of the application program indicates a larger display size of the icon; or
in a case that the attribute information of the application program comprises the duration since the last time of using the application program, shorter duration since the last time of using the application program indicates a larger display size of the icon; or
in a case that the attribute information of the application program comprises the application type of the application program, if the application type of the application program is a first application type, the display size of the icon is a first display size; or if the application type of the application program is a second application type, the display size of the icon is a second display size, wherein the first display size is larger than the second display size.

10. The electronic device according to claim 7, wherein the computer program, when executed by the processor, causes the electronic device further to perform:
receiving a fourth input performed by the user for a second icon, wherein the second icon is an icon in the at least two icons;
displaying a start control on the first interface in response to the fourth input;
receiving a fifth input performed by the user for the second icon and the start control; and
in response to the fifth input, displaying an interface of a second application program indicated by the second icon.

11. The electronic device according to claim 10, wherein a display size of the second icon is smaller than the fixed size, and the fifth input is an input of dragging the second icon to the start control; and
in a process of dragging the second icon to the start control, the display size of the second icon increases with a decrease of a target distance, and the target distance is a distance between the second icon and the start control.

12. The electronic device according to claim 7, wherein the computer program, when executed by the processor, causes the electronic device further to perform:
receiving a sixth input performed by the user for a third icon, wherein the third icon is an icon in the at least two icons; and
in response to the sixth input, uninstalling a third application program indicated by the third icon, wherein
the sixth input is an input of dragging the third icon beyond a target area, and the target area is an area in which the at least two icons are located on the first interface.

13. A non-transitory computer-readable storage medium, wherein the non-transitory computer-readable storage medium stores a computer program, and the computer program, when executed by a processor of an electronic device, causes the electronic device to perform:
- receiving a first input performed by a user for a first icon, wherein the first icon is an icon whose display size is smaller than a fixed size in at least two icons on a first interface;
- displaying the first icon in the fixed size in response to the first input;
- receiving a second input performed by the user for the first icon; and
- in response to the second input, displaying an interface of a first application program indicated by the first icon; wherein
- the at least two icons are displayed in at least two display sizes, each of the at least two display sizes corresponds to one display level of an icon; a number of inputs of the first input is determined based on a display level corresponding to a display size of the first icon.

14. The non-transitory computer-readable storage medium according to claim 13, wherein the computer program, when executed by the processor, causes the electronic device further to perform:
- receiving a third input performed by the user; and
- displaying the first interface in response to the third input, wherein the at least two icons on the first interface are displayed in at least two display sizes, and a display size of each of the at least two icons corresponds to attribute information of an application program indicated by icon; and
- the attribute information of the application program comprises at least one of: a use frequency of the application program, use duration of the application program, duration since the last time of using the application program, or an application type of the application program.

15. The non-transitory computer-readable storage medium according to claim 14, wherein for each of the at least two icons,
- in a case that the attribute information of the application program comprises the use frequency of the application program, a higher use frequency of the application program indicates a larger display size of the icon; or
- in a case that the attribute information of the application program comprises the use duration of the application program, longer use duration of the application program indicates a larger display size of the icon; or
- in a case that the attribute information of the application program comprises the duration since the last time of using the application program, shorter duration since the last time of using the application program indicates a larger display size of the icon; or
- in a case that the attribute information of the application program comprises the application type of the application program, if the application type of the application program is a first application type, the display size of the icon is a first display size; or if the application type of the application program is a second application type, the display size of the icon is a second display size, wherein the first display size is larger than the second display size.

16. The non-transitory computer-readable storage medium according to claim 13, wherein the computer program, when executed by the processor, causes the electronic device further to perform:
- receiving a fourth input performed by the user for a second icon, wherein the second icon is an icon in the at least two icons;
- displaying a start control on the first interface in response to the fourth input;
- receiving a fifth input performed by the user for the second icon and the start control; and
- in response to the fifth input, displaying an interface of a second application program indicated by the second icon.

17. The non-transitory computer-readable storage medium according to claim 16, wherein a display size of the second icon is smaller than the fixed size, and the fifth input is an input of dragging the second icon to the start control; and
- in a process of dragging the second icon to the start control, the display size of the second icon increases with a decrease of a target distance, and the target distance is a distance between the second icon and the start control.

18. The non-transitory computer-readable storage medium according to claim 13, wherein the computer program, when executed by the processor, causes the electronic device further to perform:
- receiving a sixth input performed by the user for a third icon, wherein the third icon is an icon in the at least two icons; and
- in response to the sixth input, uninstalling a third application program indicated by the third icon, wherein
- the target input area is an input area in the first interface, or the target input area is an input area in a second interface, and the first interface and the second interface are different.

* * * * *